United States Patent
Nishimoto et al.

(10) Patent No.: US 10,090,898 B2
(45) Date of Patent: Oct. 2, 2018

(54) WIRELESS COMMUNICATION SYSTEM AND METHOD FOR FORMING A PLURALITY OF DIRECTED BEAMS AND PRECODING TO ADJUST THE RECEIVED POWER AT SELECTED RECEIVING APPARATUSES

(71) Applicant: Mitsubishi Electric Corporation, Chiyoda-ku (JP)

(72) Inventors: Hiroshi Nishimoto, Tokyo (JP); Akinori Taira, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/551,056

(22) PCT Filed: May 26, 2016

(86) PCT No.: PCT/JP2016/065638
§ 371 (c)(1),
(2) Date: Aug. 15, 2017

(87) PCT Pub. No.: WO2017/006642
PCT Pub. Date: Jan. 12, 2017

(65) Prior Publication Data
US 2018/0069608 A1    Mar. 8, 2018

(30) Foreign Application Priority Data
Jul. 9, 2015  (JP) .................................. 2015-137952

(51) Int. Cl.
*H04B 7/0456* (2017.01)
*H04B 7/0426* (2017.01)
(Continued)

(52) U.S. Cl.
CPC ............. *H04B 7/0456* (2013.01); *H04B 7/04* (2013.01); *H04B 7/0426* (2013.01); *H04B 7/10* (2013.01);
(Continued)

(58) Field of Classification Search
CPC ........................... H04B 7/0456; H04B 7/0426
See application file for complete search history.

(56) References Cited

U.S. PATENT DOCUMENTS

| | | | |
|---|---|---|---|
| 7,668,077 B2 | 2/2010 | Wu et al. | |
| 8,194,778 B2 | 6/2012 | Ko et al. | |

(Continued)

FOREIGN PATENT DOCUMENTS

| | | |
|---|---|---|
| JP | 4709209 B2 | 6/2011 |
| JP | 5628973 B2 | 11/2014 |
| JP | 2014-230281 A | 12/2014 |

OTHER PUBLICATIONS

International Search Report dated Aug. 9, 2016 in PCT/JP2016/065638 filed May 26, 2016.
(Continued)

*Primary Examiner* — Devan Sandiford
(74) *Attorney, Agent, or Firm* — Oblon, McClelland, Maier & Neustadt, L.L.P.

(57) ABSTRACT

A transmitting apparatus according to the present invention includes transmission antennas capable of forming a plurality of beams respectively directed to a plurality of terminals and a precoder unit that performs precoding on signals transmitted from the transmission antennas such that received power in the terminals excluding a desired terminal serving as a transmission destination of a transmission signal and two or more IUI terminals, which are the terminals other than the desired terminal, is equal to or smaller than a threshold.

15 Claims, 10 Drawing Sheets

(51) Int. Cl.
   *H04B 7/04* (2017.01)
   *H04B 7/10* (2017.01)
   *H04W 16/28* (2009.01)
   *H04B 7/0408* (2017.01)
   *H04B 7/0452* (2017.01)

(52) U.S. Cl.
   CPC .......... *H04W 16/28* (2013.01); *H04B 7/0408* (2013.01); *H04B 7/0452* (2013.01)

(56) References Cited

U.S. PATENT DOCUMENTS

| | | | |
|---|---|---|---|
| 8,532,217 B2 | 9/2013 | Ko et al. | |
| 8,824,386 B2* | 9/2014 | Pare, Jr. ............... | H04B 7/0452 370/329 |
| 2007/0280116 A1* | 12/2007 | Wang ................... | H04B 7/0417 370/236 |
| 2008/0080631 A1* | 4/2008 | Forenza ............... | H04B 7/0684 375/260 |
| 2008/0225962 A1* | 9/2008 | Zhou .................... | H04B 7/0413 375/260 |
| 2010/0316163 A1* | 12/2010 | Forenza ................ | H04B 7/024 375/296 |
| 2011/0002371 A1* | 1/2011 | Forenza ............... | H04B 7/0417 375/227 |
| 2011/0002410 A1* | 1/2011 | Forenza ............... | H04B 7/0617 375/267 |
| 2011/0177834 A1* | 7/2011 | Shin .................... | H04J 11/0033 455/501 |
| 2011/0249665 A1* | 10/2011 | Seyama .............. | H04L 27/2646 370/350 |
| 2012/0020319 A1* | 1/2012 | Song ................. | H04W 72/1231 370/330 |
| 2012/0093078 A1* | 4/2012 | Perlman ................ | H04B 7/024 370/328 |
| 2012/0281783 A1* | 11/2012 | Cheng ................. | H04B 7/0456 375/295 |
| 2013/0028341 A1* | 1/2013 | Ayach .................. | H04B 7/0478 375/267 |
| 2013/0107916 A1* | 5/2013 | Liu ...................... | H04B 7/0452 375/219 |
| 2013/0195217 A1* | 8/2013 | Zhu ........................ | H04L 25/49 375/296 |
| 2013/0208619 A1* | 8/2013 | Kudo .................. | H04B 7/0452 370/252 |
| 2014/0219449 A1* | 8/2014 | Shattil .................. | H04W 12/08 380/270 |
| 2014/0294107 A1* | 10/2014 | Shin .................... | H04B 7/0456 375/267 |
| 2015/0141004 A1* | 5/2015 | Cheekatla ............ | H04W 24/02 455/434 |
| 2015/0180561 A1* | 6/2015 | Jindal ............... | H04L 25/03898 375/267 |
| 2015/0333808 A1* | 11/2015 | Onodera ................ | H04B 7/024 370/329 |
| 2016/0182196 A1* | 6/2016 | Lorca Hernando ... | H04L 5/0094 375/267 |
| 2018/0062265 A1* | 3/2018 | Tegreene ............ | H01Q 9/0442 |
| 2018/0102819 A1* | 4/2018 | Nishimoto .............. | H04B 7/04 |

OTHER PUBLICATIONS

Written Opinion dated Aug. 9, 2016 in PCT/JP2016/065638 filed May 26, 2016.

Minjoong Rim, "Multi-user downlink beamforming with multiple transmit and receive antennas" Electronics Letters, vol. 38, No. 25, Dec. 5, 2002, pp. 1725-1726.

Lai-U Choi, et al., "A Transmit Preprocessing Technique for Multiuser MIMO Systems Using a Decomposition Approach" IEEE Transactions on VVireless Communications, vol. 3, No. 1, Jan. 2004, pp. 20-24.

Takeo Ohgane, et al., "Applications of Space Division Multiplexing and Those Performance in a MIMO Channel" IEICE Trans. Commun., vol. E88-B, No. 5, May 2005, pp. 1843-1851.

Hiroshi Harashima, et al., "Matched-Transmission Technique for Channels With Intersymbol Interference" IEEE Transactions on Communications, vol. 20, Aug. 1972, pp. 774-780.

Bertrand M. Hochwald, et al., "A Vector-Perturbation Technique for Near-Capacity Multiantenna Multiuser Communication—Part II: Perturbation" IEEE Transactions on Communications, vol. 53, No. 3, Mar. 2005, pp. 537-544.

Tomoki Sada, et al., "A Generalized Approach to Block Diagonalization for Multiuser MIMO Downlink" 2010 IEEE 21$^{st}$ International Symposium on Personal Indoor and Mobile Radio Communications, 2010, 7 Pages.

Tomoki Sada, et al., "An Evaluation of Transmit Diversity Gain in Generalized Block Diagonalization for Multiuser MIMO Downlink" 2011 Nen the IEICE General Conference (Tsushin Koen Ronbunshu 1), Mar. 2011, 4 Pages (with partial English language translation).

Shohei Kato, et al., "Imperfect Block Diagonalization for Downlink Multiuser MIMO Systems" IEICE Technical Report RCS2007-241, 2008, 10 Pages (with partial English language translation).

Yuichi Kitamura, et al., "Performance Evaluation of Muting-Based Partially Non-Orthogonal Block Diagonalization in Multiuser MIMO with Limited Channel State Information Feedback" 2011 Nen IEICE Communications Society Conference (Tsushin Koen Ronbunshu 1), Sep. 2011, 5 Pages (with partial English language translation).

Extended European Search Report dated May 4, 2018 in European Patent Application No. 16 821 113.4, 12 pages.

Yuyuan Chang, et al., "Simplified Block Diagonalization for Multiuser MIMO Systems with Gram-Schmidt Orthogonalization", IEICE Transactions on Fundamentals of Electronics, Communications and Computer Sciences, Engineering Sciences Society, vol. E94-A, No. 11, Nov. 1, 2011, XP001572103, pp. 2263-2270.

Holger Boche, et al., "Multi-Antenna Downlink Transmission with Individual SINR Receiver Constraints for Cellular Wireless Systems", ITG-Fachberichte, vol. 183, Jan. 28, 2002, XP001154395, pp. 159-166.

* cited by examiner

WIRELESS COMMUNICATION SYSTEM AND METHOD FOR FORMING A PLURALITY OF DIRECTED BEAMS AND PRECODING TO ADJUST THE RECEIVED POWER AT SELECTED RECEIVING APPARATUSES

FIELD

The present invention relates to a transmitting apparatus, a receiving apparatus, a communication system, and a transmission precoding method for performing multi-user MIMO (Multiple-Input Multiple-Output) transmission.

BACKGROUND

In recent years, as a wireless communication system that realizes high-speed transmission in a limited frequency band, a multi-user MIMO (MU (Multi-User)-MIMO) system obtained by applying a space division multiple access (SDMA) scheme to an MIMO system in which pluralities of antennas are set in both of a transmitter and a receiver has been actively examined. In the MU-MIMO system, a plurality of terminals including pluralities of antennas are present with respect to a base station including a plurality of antennas. The base station performs simultaneous transmission to the terminals in the same wireless frequency band.

In communication in a downlink, that is, a direction from the base station to the terminal in the MU-MIMO system, signals are simultaneously transmitted from the base station to the terminals. Therefore, in general, in a received signal in the terminal, signals to the other terminals are included in addition to a desired signal, which is a signal to the own terminal. That is, inter-user interference (IUI), which is interference caused by the signals to the other terminals occurs. IUI measures are desirably performed on the base station side, where limitations concerning a processing amount and the number of antennas are small compared with the terminals, as much as possible. Therefore, in the downlink in the MU-MIMO system, the base station carries out processing called precoding as the IUI measures. The preceding indicates processing for forming a beam by weighting a plurality of signals transmitted from a plurality of antennas.

As a representative precoding method performed as the IUI measures in the downlink in the MU-MIMO system, block diagonalization (BD) method has been extensively examined. Please refer to, for example, Non Patent Literatures 1 and 2. The BD method is a precoding method for forming a beam space to direct null to terminals other than a desired terminal, that is, form directivity for reducing received power in the terminals other than the desired terminal to 0. By applying the BD method to all the terminals, it is possible to realize a MU-MIMO system in which the IUI does not occur. Consequently, it is possible to simplify processing and an apparatus configuration in the terminals.

CITATION LIST

Non Patent Literature

Non Patent Literature 1: M. Rim, "Multi-user downlink beamforming with multiple transmit and receive antennas," Electron. Lett., vol. 38, no. 25, pp. 1725-1726, December 2002.

Non Patent Literature 2: L. U. Choi and R. D. Murch, "A Transmit Preprocessing Technique for Multiuser MIMO Systems Using a Decomposition Approach," IEEE Trans. On Wireless Commun., vol. 3, no. 1, pp. 20-24, January 2004.

SUMMARY

Technical Problem

When a plurality of transmission antennas are present, a transmission diversity effect is obtained. However, in the BD method, because null steering for directing null to the terminals other than the desired terminal is performed, a degree of freedom of a beam formed by a plurality of signals transmitted from the antennas of the base station is lost. Therefore, in the preceding to which the BD method is applied, it is difficult to form a beam to increase the transmission diversity effect, that is, improve a received signal-to-nose power ratio (SNR: Signal-to-Noise power Ratio) of the terminals. In particular, in an environment in which a larger number of terminals are present, the degree of freedom of the beam formation is greatly lost because of the null steering for the terminals. In this way, in the DB method, there is a problem in that it is difficult to improve a transmission diversity gain.

The present invention has been devised in view of the above, and an object of the present invention is to obtain a transmitting apparatus that can improve a transmission diversity gain compared with the BD method.

Solution to Problem

To solve the problems and achieve the object, a transmitting apparatus according to the present invention includes a plurality of transmission antennas capable of forming a plurality of beams respectively directed to a plurality of receiving apparatuses. A transmitting apparatus according to the present invention includes a precoder to perform precoding on signals transmitted from the transmission antennas such that received power in third receiving apparatuses, which are the receiving apparatuses excluding a first receiving apparatus serving as a transmission destination of a transmission signal among the receiving apparatuses and two or more second receiving apparatuses among the receiving apparatuses, is equal to or smaller than a threshold.

Advantageous Effects of Invention

The transmitting apparatus according to the present invention achieves an effect that it is possible to improve a transmission diversity gain compared with the BD method.

DESCRIPTION OF EMBODIMENTS

Transmitting apparatuses, receiving apparatuses, communication systems, and transmission precoding methods according to embodiments of the present invention are explained below with reference to the drawings. Note that the present invention is not limited by the embodiments.

First Embodiment

Figure 1:
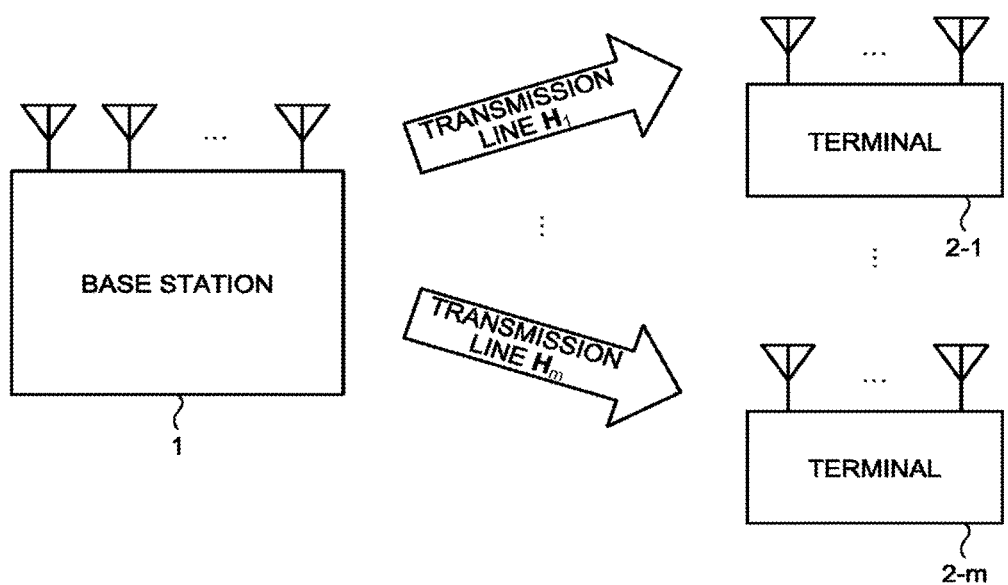
FIG. 1 is a diagram showing a configuration example of a communication system according to a first embodiment.

FIG. 1 is a diagram showing a configuration example of a communication system according to a first embodiment of the present invention. As shown in FIG. 1, the communication system in this embodiment includes a base station 1 and a terminal 2-1 to a terminal 2-m; m is an integer equal to or larger than 2. In the following explanation, the terminals 2-1 to 2-m are sometimes referred to as users. When the terminals 2-1 to 2-m are explained without being distinguished, the terminals 2-1 to 2-m are described as terminals 2. The base station 1 includes a plurality of antennas. The Each of the terminals 2-1 to 2-m includes one or more antennas.

In this embodiment, downlink communication, which is communication from the base station 1 to the user terminals 2, is explained. Therefore, the base station 1 is a transmitting apparatus and the terminals 2 are receiving apparatuses. In the communication system in this embodiment, a MU-MIMO scheme is used in the downlink communication. The base station 1 carries out precoding on transmission signals transmitted from the antennas and is capable of forming beams directed to the terminals 2. Note that the base station 1 and the terminals 2 can perform communication in which the terminals 2 are transmitting apparatuses and the base station 1 is a receiving apparatus, that is, uplink communication. An uplink communication method can be any communication scheme.

First, terms in this embodiment are explained. In the following explanation, physical transmission and reception antennas are referred to as "antennas" and an array of a plurality of antennas included in one apparatus, that is, an antenna group is referred to as "array". Alternatively, a plurality of signal arrays corresponding to the array is sometimes also simply referred to as array for convenience. An array of a plurality of transmission antennas is referred to as "transmission array". An array of a plurality of reception antennas is referred to as "reception array". An effective number of antennas observed when the transmission array or the reception array is multiplied with a weight matrix, which is a matrix indicating weight, is referred to as "branch". The number of reception branches, which are branches on a reception side, is the number of data transmitted to the terminals 2, which are the receiving apparatuses, in parallel and is the number of rows of a reception weight matrix, which is a weight matrix multiplied in the terminals 2. The number of transmission branches, which are branches on a transmission side, is the number of rows of a transmission weight matrix, which is a weight matrix multiplied in the base station 1, which is the transmitting apparatus, that is, transmission precoding.

There is no limitation on the number of antennas included in the terminals 2. The present invention is also applicable when the number of antennas is different in each of the terminals 2 and when the number of reception branches is different in each of the terminals 2. However, to simplify the explanation, in the following explanation, the number of antennas included in the terminals 2 is R (R is an integer equal to or larger than one) irrespective of the terminals. In the terminals 2, $N_w$ ($N_w \leq R$) weight matrixes are multiplied with the reception array. Therefore, the number of reception branches per one terminal 2 observed from the base station 1, which is the transmitting apparatus, is $N_w$ irrespective of the terminals 2. Consequently, a total number of reception branches $N_{w, total}$, which is the number of branches of all the terminals, is $N_{w, total\ 1} = \Sigma_{k=1}^{m}(N_w) = m \times N_w$. Weight applied to the reception array is assumed in calculation of the precoding matrix. Any weight can be applied as the weight. For example, weight in the case of $N_w$=R can be a unit matrix or can be an eigenvector matrix of a transmission line matrix. Any matrix can be used as the reception weight matrix. In the following explanation, when the number of IUI terminals per one desired terminal explained below is represented as L (L≥2), the number of transmission antennas and the number of reception branches satisfy a relation of t≥ $N_{w, total} - L \times N_w = (m-L) \times N_w$.

Subsequently, the downlink communication in the communication system in this embodiment, in which the MU-MIMO scheme is adopted, is modeled by a formula. A transmission signal vector transmitted to a terminal 2-i (i= 1, . . . , and m) is represented as s(bold face)$_i$(t), a transmission power distribution matrix, which is a matrix indicating power distribution to the terminal 2-i, is represented as P(bold face)$_i$, and a preceding matrix, that is, a beam formation matrix corresponding to the terminal 2-i is represented as B(bold face)$_i$. A true transmission line matrix of R×T from an antenna of the base station 1 to an antenna of the terminal 2-i is represented as H(bold face)(hat)$_i$, a reception weight matrix of Nw×R of the terminal 2-i is represented as W(bold face)$_i$, and a true received signal vector before reception weight multiplication of the terminal 2-i is represented as y(bold face)$_i$(t). Further, a received signal vector after the reception weight multiplication of the terminal 2-i is represented as r(bold face)$_i$(t). A true reception thermal noise vector in the transmission line from the antenna of the base station 1 to the antenna of the terminal 2-i is represented as n(bold face)(hat)$_i$(t). At this point, a system model obtained by modeling the communication system in this embodiment according to a formula can be defined by the following Expression (1).

[Math. 1]

$$\begin{bmatrix} r_1(t) \\ \vdots \\ r_m(t) \end{bmatrix} = \begin{bmatrix} W_1 & \cdots & O \\ \vdots & \ddots & \vdots \\ O & \cdots & W_m \end{bmatrix} \begin{bmatrix} y_1(t) \\ \vdots \\ y_m(t) \end{bmatrix} \quad (1)$$

$$= \begin{bmatrix} W_1 & \cdots & O \\ \vdots & \ddots & \vdots \\ O & \cdots & W_m \end{bmatrix}$$

$$\left( \begin{bmatrix} \hat{H}_1 \\ \vdots \\ \hat{H}_m \end{bmatrix} [B_1 \ \cdots \ B_m] \begin{bmatrix} \sqrt{P_1} & \cdots & O \\ \vdots & \ddots & \vdots \\ O & \cdots & \sqrt{P_m} \end{bmatrix} \begin{bmatrix} s_1(t) \\ \vdots \\ s_m(t) \end{bmatrix} + \begin{bmatrix} \hat{n}_1(t) \\ \vdots \\ \hat{n}_m(t) \end{bmatrix} \right)$$

Further, $N_w \times T$ matrix obtained by multiplying together the reception weight matrix W(bold face)$_i$ and the true transmission line matrix H(bold face)(hat)$_i$ is represented as a new transmission line matrix H(bold face)$_i$ and an $N_w$-th order vector obtained by multiplying together the true reception thermal noise vector n(bold face)(hat)$_i$(t) and the reception weight matrix W(bold face)$_i$ is represented as a new reception thermal noise vector n(bold face)$_i$(t). Then, the system model can be represented by the following Expression (2).

[Math. 2]

$$\begin{bmatrix} r_1(t) \\ \vdots \\ r_m(t) \end{bmatrix} = \begin{bmatrix} H_1 \\ \vdots \\ H_m \end{bmatrix} [B_1 \ \cdots \ B_m] \begin{bmatrix} \sqrt{P_1} & \cdots & O \\ \vdots & \ddots & \vdots \\ O & \cdots & \sqrt{P_m} \end{bmatrix} \begin{bmatrix} s_1(t) \\ \vdots \\ s_m(t) \end{bmatrix} + \begin{bmatrix} n_1(t) \\ \vdots \\ n_m(t) \end{bmatrix} \quad (2)$$

The above Expression (2) can be represented as the following Expression (3).

[Math. 3]

$$\bar{r}(t) = \overline{HBP}\bar{s}(t) + \bar{n}(t) \quad (3)$$

In the expression, H(bold face)(bar) is a system transmission line matrix of $N_{w,\,total} \times T$ indicating a transmission line from the antenna of the base station 1 to all branches of all the terminals 2 after the multiplication of the reception weight. B(bold face)(bar) is a system precoding matrix of $T \times N_{st}$ for all the terminals 2 in the base station 1. Note that $N_{st}$ is a total number of signals simultaneously transmitted to all the terminals 2 in parallel. P(bold face)(bar) is a system transmission power matrix, which is a matrix that sets transmission power distribution to all the terminals 2, s(bold face)(bar)(t) is an $N_{st}$-th order system transmission vector indicating transmission signals to all the terminals 2, and n(bold face)(bar)(t) is an $N_{w,\,total}$-th order system noise vector, which a noise vector for all the terminals 2 after the reception weight multiplication. As indicated by the following Expression (4), a product of H(bold face)(bar) and B(boldface)(bar) can be grasped as an effective system transmission line matrix H(bold face)(bar)$_e$ by transmission beam formation.

[Math. 4]

$$\bar{H}_e = \begin{bmatrix} H_1 B_1 & H_1 B_2 & \cdots & H_1 B_m \\ H_2 B_1 & H_2 B_2 & \cdots & H_2 B_m \\ \vdots & \vdots & \ddots & \vdots \\ H_m B_1 & H_m B_2 & \cdots & H_m B_m \end{bmatrix} \quad (4)$$

A precoding method for using a precoding matrix for leaving only block diagonal terms, that is, components of H(bold)$_i$B(bold face)$_i$ and setting non-block diagonal terms, which are the other components, to a zero matrix 0(bold face) in the effective system transmission line matrix H(bold face)(bar)$_e$ shown in Expression (4) is the BD method. In this embodiment, a explained below in detail, a precoding matrix for not setting all of the non-block diagonal terms as the zero matrix 0(bold face) and leaving a component of one terminal 2 other than the transmission target terminal 2 of a transmission signal as an interference component is used. Consequently, it is possible to secure a degree of freedom of beam formation by the transmission array and improve a diversity gain in the transmission target terminal 2 compared with the BD method while suppressing IUI.

Figure 2:
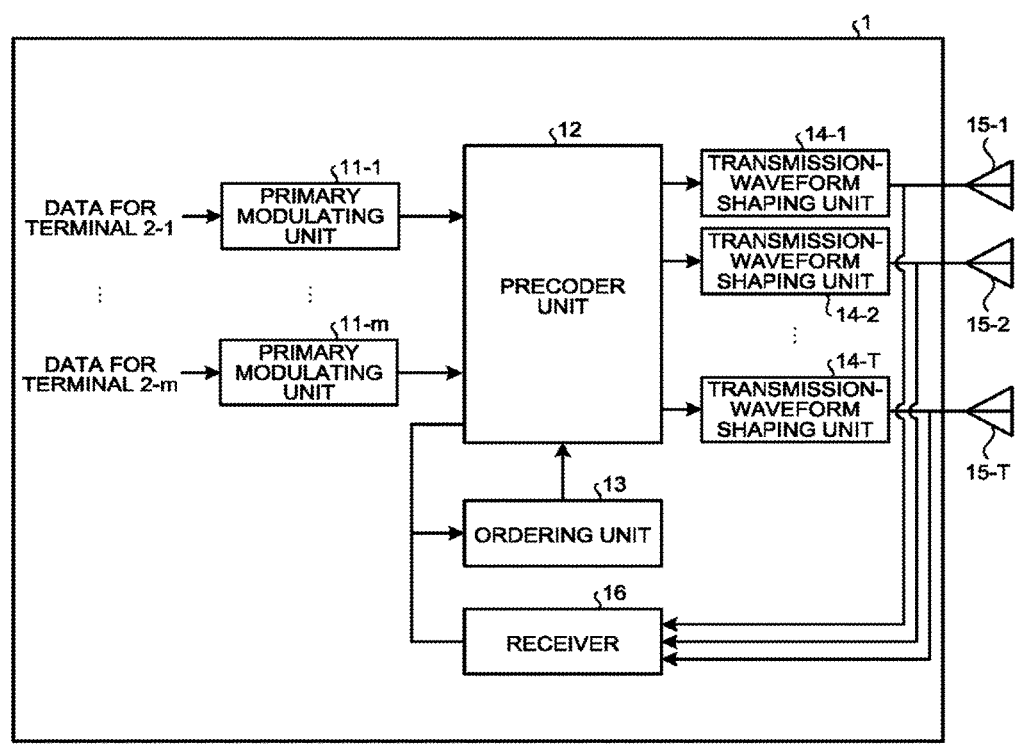
FIG. 2 is a diagram showing a configuration example of a base station in the first embodiment.

FIG. 2 is a diagram showing a configuration example of the base station 1 in this embodiment. The base station 1 includes primary modulating units 11-1 to 11-$m$, a precoder unit 12, an ordering unit 13, transmission-waveform shaping units 14-1 to 14-T, antennas 15-1 to 15-T, and a receiver 16. A primary modulating units 11-$i$ (i=1, . . . , ) performs primary modulation on a transmission signal transmitted to the terminal 2-$i$ and outputs the primarily-modulated transmission signal to the precoder unit 12. The primary modulation performed by the primary modulating unit 11-$i$ includes, for example, channel coding and mapping to a primary modulation symbol such as a QAM (Quadrature Amplitude Modulation) symbol. When a single carrier block transmission scheme is used, the primary modulation performed by the primary modulating unit 11-$i$ includes discrete Fourier transform processing as well. The primary modulating units 11-1 to 11-$m$ are signal generating units that generate, for each of the terminals 2, which are receiving apparatuses, a transmission signal transmitted to the terminal 2.

The precoder unit 12 is a precoder that performs precoding on signals transmitted from the antennas 15-1 to 15-T, which are a plurality of transmission antennas, such that received power in third receiving apparatuses, which are the terminals 2 excluding a first receiving apparatus, which is the terminal 2 serving as a transmission destination of transmission signals output from the primary modulating units 11-1 to 11-$m$ among the terminals 2-1 to 2-$m$, and second receiving apparatuses, which are two or more terminals 2 other than the first receiving apparatus among the terminals 2-1 to 2-$m$, is 0, that is, equal to or smaller than a threshold. The first receiving apparatus is a desired terminal explained below. The second receiving apparatuses are IUI terminals explained below. Received power in the IUI terminals, which are the second receiving apparatuses, is larger than the threshold.

Specifically, the precoder unit 12 performs precoding by multiplying the transmission signals after the primary modulation output from the primary modulating units 11-1 to 11-$m$ with the preceding matrix in this embodiment and outputs the transmission signals after the precoding respectively to the transmission-waveform shaping units 14-1 to 14-T corresponding to the transmission signals. The ordering unit 13 instructs the precoder unit 12 to perform ordering of the terminals 2 in the precoding and power distribution to the terminals 2. That is, the ordering unit 13 determines the order of the terminals 2 in the precoding. The transmission-waveform shaping units 14-1 to 14-T respectively perform secondary modulation, digital-analog (D/A) conversion, conversion from a baseband frequency into a radio frequency (RF), and the like on the signals after the precoding and transmit the signals after the processing respectively via the antennas 15-1 to 15-T. For example, the secondary modulation is multicarrier modulation when a multicarrier scheme such as OFDM (Orthogonal Frequency Division Multiplex) is applied and is single carrier modulation when a single carrier scheme such as single carrier block transmission is applied. There is no limitation on a modulation scheme of the secondary modulation. Modulation other than the OFDM and the single carrier block transmission can be performed. When block transmission such as the OFDM or the single carrier block transmission is applied, the transmission-waveform shaping units 14-1 to 14-T perform, for example, inverse discrete Fourier transform and CP (Cyclic Prefix) addition processing before the D/A conversion. Note that the block transmission indicates a scheme for converting a single into a block through the discrete Fourier transform processing and the CP addition as represented by the OFDM and the single carrier block transmission. The signal processing in the transmission-waveform shaping units 14-1 to 14-T can be digital processing or can be analog processing. Note that the transmission signals input to the precoder unit 12 from the primary modulating units 11-1 to 11-$m$ correspond to s(bold face)(bar)(t) in Expression (3) and the output signals output to the transmission-waveform shaping units 14-1 to 14-T from the precoder unit 12 correspond to B(bold face)(bar)P(bold face)(bar)s(bold face)(bar)(t) in Expression (3).

Because the precoding by the precoder unit 12 is carried out, the antennas 15-1 to 15-T, which are the transmission antennas, are capable of forming a plurality of beams respectively directed to the terminals 2.

The receiver 16 carries out reception processing on received signals received from the terminals 2 through the antennas 15-1 to 15-T. Note that, in an example explained here, the antennas 15-1 to 15-T are transmission and reception antennas. However, reception antennas can be provided separately from the antennas 15-1 to 15-T. However, when the base station 1 uses an estimation result of an uplink transmission line as downlink transmission line information in a calculation process of a precoding matrix explained below, the antennas 15-1 to 15-T are transmission and reception antennas and the receiver 16 performs estimation of a transmission line on the basis of received signals received from the antennas 15-1 to 15-T. Any method can be used as an estimation method for a transmission line. For example, a method of estimating a transmission line using a pilot signal, which is a known signal, can be used. Specifically, pilot signals, which are orthogonal among the antennas of the terminal 2, are transmitted from the terminal 2. The receiver 16 of the base station 1 can identify the antennas of the terminal 2 according to the orthogonal pilots and estimate a transmission line. In the calculation process of the precoding matrix explained below, when the base station 1 uses transmission line information received from the terminal 2, the receiver 16 outputs the received transmission line information to the precoder unit 12.

Figure 3:
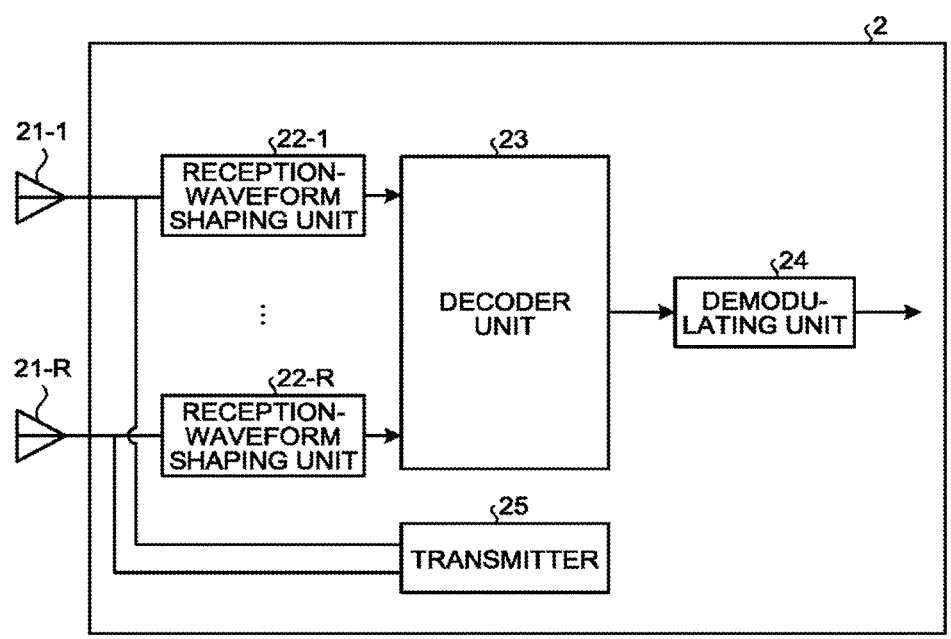
FIG. 3 is a diagram showing a configuration example of a terminal in the first embodiment.

FIG. 3 is a diagram showing a configuration example of the terminal 2 in this embodiment. The terminal 2 includes antennas 21-1 to 21-R, reception-waveform shaping units 22-1 to 22-R, a decoder unit 23, a demodulating unit 24, and a transmitter 25. The reception-waveform shaping units 22-1 to 22-R respectively perform processing for converting a radio frequency into a baseband frequency, analog-digital (A/D) conversion, signal filter processing, and the like on received signals received by the antennas 21-1 to 21-R and output the received signals after the processing to the decoder unit 23. The signal filter processing is processing for extracting, for example, a signal in a desired frequency band. When a block transmission scheme is applied, the reception-waveform shaping units 22-1 to 22-R carry out CP removal processing and the discrete Fourier transform processing as well. The decoder unit 23 performs MIMO decode processing, which is processing for extracting a desired signal, that is, a signal to the own terminal, on the received signals input from the reception-waveform shaping units 22-1 to 22-R and outputs the signals after the processing to the demodulating unit 24. The decoder unit 23 is a decoder that extracts a desired signal from signals received from the base station 1. The decoder unit 23 carries out estimation processing for a transmission line in a process of the MIMO decode processing. The demodulating unit 24 performs demapping processing, channel decoding processing, and the like on the signals output from the decoder unit 23 and restores the signals transmitted from the base station 1. When the single carrier block transmission scheme is applied, the demodulating unit 24 carries out equalization processing for compensating for frequency distortion and the inverse discrete Fourier transform processing. The signal processing in the reception-waveform shaping units 22-1 to 22-R can be digital processing or can be analog processing.

The transmitter 25 generates a transmission signal and transmits the transmission signal from the antennas 21-1 to 21-R to the base station 1. Note that, in an example explained here, the antennas 21-1 to 21-R are transmission and reception antennas. However, transmission antennas can be provided separately from the antennas 21-1 to 21-R. However, in the calculation process of the precoding matrix explained below, when the base station 1 uses transmission line information received from the terminal 2, the transmitter 25 acquires transmission line information, which is information concerning a transmission line estimated by the decoder unit 23, from the decoder unit 23 and transmits the transmission line information to the base station 1. In the calculation process of the precoding matrix explained below, when the base station 1 uses an estimation result of an uplink transmission line as downlink transmission line information, the antennas 21-1 to 21-R are transmission and reception antennas. The transmitter 25 transmits transmission signals from the antennas 21-1 to 21-R.

Hardware configurations of the base station 1 and the terminal 2 in this embodiment are explained. The components configuring the base station 1 shown in FIG. 1 can be respectively realized as hardware such as electronic circuits and antennas. The primary modulating units 11-1 to 11-$m$ are mappers or modulators. When the primary modulation includes the discrete Fourier transform processing, a discrete Fourier transform processing circuit is added. The precoder unit 12 is a processing circuit that carries out precoding. The ordering unit 13 is a processing circuit that performs ordering. The transmission-waveform shaping units 14-1 to 14-T are transmission-waveform shaping circuits and, specifically, configured by D/A converters, frequency converters, and the like. When the transmission-waveform shaping units 14-1 to 14-T perform the CP addition and the inverse discrete Fourier transform processing, the transmission-waveform shaping units 14-1 to 14-T include CP addition circuits and inverse discrete Fourier transform processing circuits.

The processing circuit that realizes the precoder unit 12 and the ordering unit 13 can be dedicated hardware or can be a control circuit including a memory and a CPU (Central Processing Unit; also referred to as central processing device, processing device, arithmetic device, microprocessor, microcomputer, processor, or DSP (Digital Signal Processor)) that execute programs stored in the memory. For example, a nonvolatile or volatile semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), a magnetic disk, a flexible disk, an optical disk, a compact disk, a minidisk, or a DVD (Digital Versatile Disk) corresponds to the memory.

Figure 4:
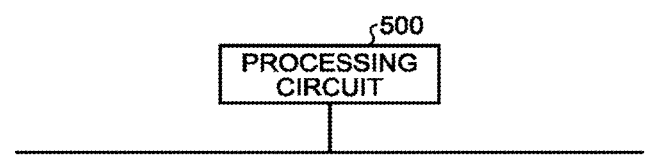
FIG. 4 is a diagram showing a configuration example of a processing circuit in the first embodiment.
Figure 5:
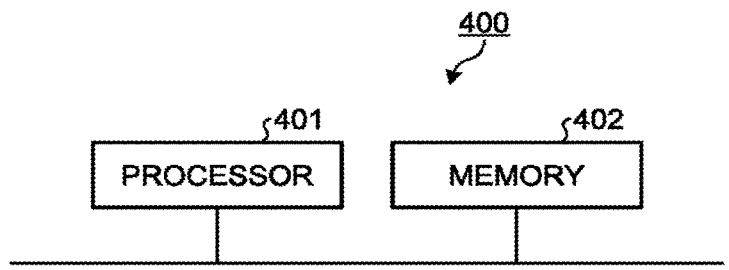
FIG. 5 is a diagram showing a configuration example of a control circuit in the first embodiment.

When the precoder unit 12 and the ordering unit 13 are realized by dedicated hardware, the precoder unit 12 and the ordering unit 13 are, for example, single circuits, composite circuits, programmed processors, parallel-programmed processors, ASICs (Application Specific Integrated Circuits), FPGAs (Field Programmable Gate Arrays), or combinations of the foregoing. When the processing circuit is realized by dedicated hardware, the processing circuit is, for example, a processing circuit 500 shown in FIG. 4.

when the precoder unit 12 and the ordering unit 13 are realized by a control circuit including a CPU, the control circuits is, for example, a control circuit 400 having a configuration shown in FIG. 5. As shown in FIG. 5, the control circuit 400 includes a processor 401, which is a CPU, and a memory 402. When the precoder unit 12 and the ordering unit 13 are realized by the control circuit 400 as shown in FIG. 5), the precoder unit 12 and the ordering unit 13 are realized by the processor 401 reading out and executing programs corresponding to respective kinds of processing by the precoder unit 12 and the ordering unit 13 stored in the memory 402. The memory 402 is also used as a temporary memory in processing carried out by the processor 401.

At least a part of the primary modulating units 11-1 to 11-m and the transmission-waveform shaping units 14-1 to 14-T can be realized by the processing circuit, which is the dedicated hardware, or the control circuit 400 like the precoder unit 12 and the ordering unit 13.

The components configuring the terminal 2 shown in FIG. 2 can be respectively realized as hardware such as electronic circuits and antennas. The reception-waveform shaping units 22-1 to 22-R are reception-waveform shaping circuits and, specifically, configured by A/D converters, filters, frequency converters, and the like. When the reception-waveform shaping units 22-1 to 22-R perform the CP removal and the discrete Fourier transform processing, the reception-waveform shaping units 22-1 to 22-R include CP removal circuits and discrete Fourier transform processing circuits. The decoder unit 23 is a processing circuit. The demodulating unit 24 is a demodulator or a demapper. When the demodulating unit 24 performs the equalization processing, the inverse discrete Fourier transform processing, and the like, the demodulating unit 24 includes an equalizer, an inverse discrete Fourier transform circuit, and the like.

The processing circuit that realizes the decoder unit 23 can be realized by dedicated hardware or can be realized by the control circuit 400. When the decoder unit 23 is realized by the control circuit 400 as shown in FIG. 5, the decoder unit 23 is realized by the processor 401 reading out and executing a program corresponding to the processing by the decoder unit 23 stored in the memory 402. At least a part of the reception-waveform shaping units 22-1 to 22-R and the demodulating unit 24 can be realized by the processing circuit, which is the dedicated hardware, or the control circuit 400 like the decoder unit 23.

The precoding processing carried out by the precoder unit 12 in this embodiment is explained. The system model in the communication system in this embodiment is as explained with reference to Expression (1) and Expression (2). The precoder unit 12 generates a precoding matrix according to a procedure explained below. Note that, in the following explanation, processing by the transmission-waveform shaping units 14-1 to 14-T and the reception-waveform shaping units 22-1 to 22-R is omitted for explanation in formulas. However, there is no influence of the processing in calculation of a precoding matrix. In the following explanation, a space between an output end of the precoder unit 12 of the base station 1 and an input end of the decoder unit 23 of the terminal is represented by an equivalent low-pass system. The precoding processing explained below can be independently carried out at each discrete frequency in the OFDM or the single carrier block transmission or can be collectively carried out in an entire band irrespective of a frequency.

In a process of the precoding matrix calculation explained below, information concerning a transmission line matrix in a downlink direction, that is, transmission line information is necessary. A method in which the precoder unit 12 acquires a transmission line matrix is not particularly limited. However, for example, when the communication system is a communication system that adopts frequency division duplex (FDD) in which communication is performed at different frequencies in a downlink and an uplink, transmission line information estimated in the terminal and received from the terminal 2 is used. When the communication system is a communication system in which a downlink and an uplink are performed by time division duplex (TDD), reversibility of transmission and reception can be used. Therefore, in this case, the receiver 16 can estimate a transmission line in an uplink direction on the basis of a signal received front the terminal 2 and use the estimated transmission line as transmission line information of the downlink. As a method for transmission line estimation, any method can be used as explained above. For example, a method of estimating a transmission line using a pilot signal can be used.

Figure 6:
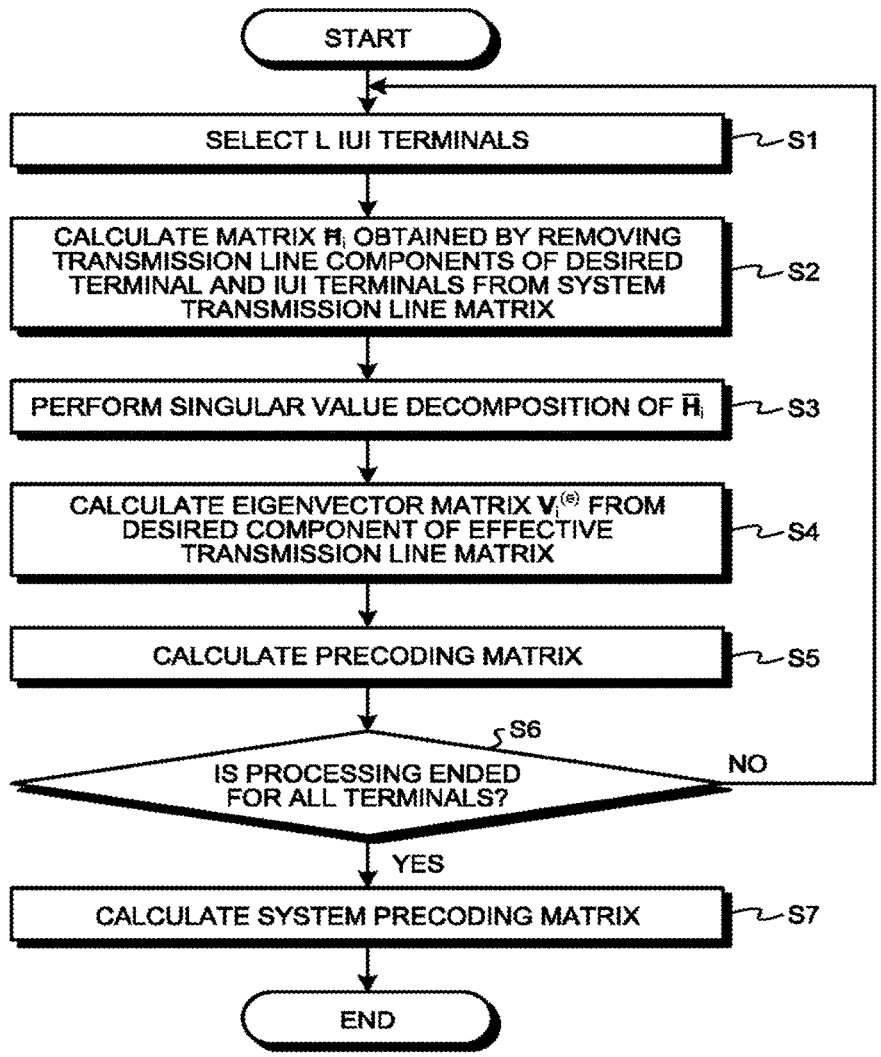
FIG. 6 is a diagram representing a flowchart showing an example of a processing procedure in a precoder unit in the first embodiment.

FIG. 6 is a flowchart showing an example of a processing procedure in the precoder unit 12 in this embodiment. In the following explanation, a terminal set as the terminal 2 at a destination of a transmission signal is referred to as desired terminal. First, the precoder unit 12 determines the desired terminal according to order determined by the ordering unit 13. To calculate a precoding matrix for the desired terminal, the precoder unit 2 selects L terminals, which are the terminals 2 that allow IUI, that is, L IUI terminals, corresponding to the desired terminal (step S1).

As explained above, in the BD method, for terminals other than the desired terminal, a beam is formed to form null to avoid IUI. On the other hand, in this embodiment, IUI is allowed for one terminal 2 other than the desired terminal. That is, a beam is formed not to form null for the L terminals 2 other than the desired terminal and to have directivity in the directions of the L terminals 2 other than the desired terminal.

As a selection method for an IUI terminal, when the desired terminal is represented as a terminal 2-$i$, there are, for example, a method of selecting a terminal including a transmission line matrix having a low correlation with H(bold face)$_i$, which is a transmission line matrix of the terminal 2-$i$, and a method of selecting the terminal 2 in a position away from the desired terminal on the basis of geographical information of the terminals 2. The former is a method of selecting an IUI terminal corresponding to the desired terminal on the basis of a correlation between a transmission line matrix between the desired terminal and the base station 1 and a transmission line matrix between the terminal 2 other than the desired terminal and the base station 1. For example, when the terminal 2 other than the desired terminal is represented as a terminal 2-$k$, the precoder unit 12 calculates, concerning all the terminals 2 other than k=i, a square sum of diagonal terms of a cross-correlation matrix H(bold face)$_k^H$H(bold face)$_i$ between H(bold face)$_i$ and a transmission line matrix H(bold face)$_k$ of the terminal 2-$k$ and selects the L terminals 2 in ascending order of square sums of the diagonal terms of H(bold face)$_k^H$H(bold face)$_i$. The latter is a method of selecting the terminal 2 on the basis of geographical separation degrees between the desired terminal and the terminals 2 other than the desired terminal. When the latter selection method is used, for example, the base station 1 calculates, on the basis of position information of the terminals 2 and position information of the base station 1, for each of the terminals 2, an azimuth angle of the terminal 2 estimated from the base station 1 and selects the L terminals 2 in order from the terminal 2, the azimuth angle of which is most away from the desired terminal. The base station 1 acquires the position information of the terminal 2 by, for example, receiving, from the terminal 2, position information calculated by the terminals 2 using a GPS (Global Positioning System). As the position information of the base station 1, for example, the position information calculated using the GPS is used. Note that the number of times a certain terminal 2 is selected as the IUI terminal in one precoding matrix calculation is L times at most. That is, in certain precoding, the same terminal cannot be redundantly selected as the IUI terminal (L+1) times or more.

Note that, as explained below, for example, when ordering is carried out by the ordering unit 13 such that a square sum of diagonal terms of the cross-correlation matrix H(bold face)$_k^H$H(bold face)$_i$ between the terminal 2 and the adjacent, that is, following terminal 2 decreases, the IUI terminal can be selected by a method of grouping the desired terminal and the L IUI terminals in index order of the terminals.

In an example explained below, the number of IUI terminals, that is, L is set to two. However, not only this, but the present invention is applicable in the case of any number of IUI terminals L≥2.

Subsequently, when the IUI terminals are represented as terminals 2-$j$ and 2-$k$, the precoder unit 12 calculates a matrix H(bold face)(bar)$_i$ obtained by excluding transmission line components of the desired terminal and the two IUI terminals from a system transmission line matrix (step S2) and performs singular value decomposition (SVD) of H(bold face)(bar)$_i$ (step S3).

As explained above, a system transmission line matrix H(bold face) is a matrix indicating transmission lines from the antennas of the base station 1 to all the branches of all the terminals 2 after the multiplication of the reception weight and can be calculated on the basis of a transmission line matrix of each of the terminals 2. A matrix H(bold face)$_i$, which is a (N$_{w, total}$−(L+1)×N$_w$)×T matrix obtained by excluding the transmission line components of the desired terminal and the IUI terminals from the system transmission line matrix H(bold face), can be represented by the following Expression (5). As indicated by Expression (5), the singular value decomposition of the H(bold face)(bar)$_i$ can be performed. The precoder unit 12 perform the singular value decomposition of H(bold face)(bar)$_i$ (step S3).

[Math. 5]

$$\bar{H}_i = \begin{bmatrix} \vdots \\ H_{i-1} \\ H_{i+1} \\ \vdots \\ H_{j-1} \\ H_{j+1} \\ \vdots \\ H_{k-1} \\ H_{k+1} \\ \vdots \end{bmatrix} = U_i \sum_i V_i^H = U_i \left[ \sum_i^{(s)} \ 0 \right] \begin{bmatrix} V_i^{(s)H} \\ V_i^{(n)H} \end{bmatrix} \quad (5)$$

In the expression, U(bold face)$_i$ is a left singular vector matrix of H(bold face)(bar)$_i$, V(bold face)$_i$ is a right singular vector matrix, and Σ(bold face)$_i$ is a singular value matrix having singular values in diagonal terms. In Σ(bold face)$_i$, when the singular values of the diagonal terms are in descending order of powers according to magnitudes, as indicated by Expression (5), the singular values can be represented by being divided into a partial diagonal matrix Σ(bold face)$_i^{(s)}$ configured by (N$_{w, total}$−(L+1)×N$_w$) non-zero singular values and a zero matrix 0(bold face) corresponding to (T−(N$_{w, total}$−(L+1)×N$_w$)) zero singular values. Right singular vectors V(bold face)$_i^{(s)}$ and V(bold face)$_i^{(n)}$ respectively corresponding to Σ(bold face)$_i$(s) and the zero matrix 0(bold face) are present. When V(bold face)$_i^{(n)}$, which is a first matrix, is a precoding matrix of the terminal 2-$i$, an effective transmission line matrix for the terminal 2-$i$ can be represented by the following Expression (6). When the precoding matrix is used, null-steering is performed for the terminals 2 other than the terminal 2-$i$, the terminal 2-$j$, and the terminal 2-$k$. When the precoding is carried out using the first matrix, null is formed for the terminals 2 excluding the terminal 2-$i$ and the terminal 2-$j$. The null indicates that received power of signals transmitted from the antennas 15-1 to 15-T is equal to or smaller than a threshold, for example, the received power is 0.

[Math. 6]

$$\bar{H}_{e,i} = \bar{H} V_i^{(n)} = \begin{bmatrix} \vdots \\ 0 \\ H_i V_i^{(n)} \\ 0 \\ \vdots \\ 0 \\ H_j V_i^{(n)} \\ 0 \\ \vdots \\ 0 \\ H_k V_i^{(n)} \\ 0 \\ \vdots \end{bmatrix} \quad (6)$$

Referring back to FIG. 6, the precoder unit 12 calculates an eigenvector matrix V(bold face)$_i^{(e)}$, which is a second matrix, from a desired component H(bold face)$_i$V(bold face)$_i^{(n)}$, which is a component corresponding to the terminal 2-$i$ in Expression (6) (step S4). That is, the precoder unit 12 generates the second matrix for forming a beam space suitable for the terminal 2-$i$, that is, directed to the terminal 2-$i$. Specifically, that is, the precoder unit 12 performs the singular value decomposition of H(bold face)$_i$V(bold face)$_i^{(n)}$ or applies the singular value decomposition to a non-negative value Hermitean matrix (H(bold face)$_i$V(bold face)$_i^{(n)}$)$^H$H(bold face)$_i$V(bold face)$_i^{(n)}$ of H(bold face)$_i$V(bold face)$_i^{(n)}$ and calculates an eigenvector matrix V(bold face)$_i^{(e)}$ corresponding to a large eigenvalue. The large eigenvalue is an eigenvalue on a forward side at the time when a plurality of eigenvalues are arranged in descending order of powers.

Subsequently, the precedes unit 12 calculates a precoding matrix corresponding to the desired terminal, that is, the terminal 2-$i$ (step S5). Specifically, the precoder unit 12 calculates the preceding matrix corresponding to the terminal 2-$i$ according to the following Expression (7). In this embodiment, as indicated by Expression (7), it is possible to realize beam formation for, by multiplying a transmission signal with V(bold face)$_i^{(n)}$, after performing null-steering on a space excluding the terminal 2-$i$, the terminal 2-$j$, and the terminal 2-$k$, multiplying the space with V(bold face)$_i$(e) to form signal spaces for the terminal 2-$i$, the terminal 2-$j$, and the terminal 2-$k$ and then improve a reception gain in the terminal 2-$i$. That is, in this embodiment, signals transmitted from the transmission antennas are multiplied with the first matrix, which is the preceding matrix for reducing received power in the terminals 2 excluding the desired terminal and the L IUI terminals to the threshold or less. A multiplication result is multiplied with the second matrix, which is the precoding matrix for forming a beam directed to the desired terminal.

[Math. 7]

$$B_i = V_i^{(n)} V_i^{(e)} \quad (7)$$

The precoder unit 12 determines whether the processing, that is, the calculation processing of preceding matrix is ended for all the terminals 2 (step S6). When the processing is ended for all the terminals 2 (Yes at step S6), the precoder unit 12 calculates a system precoding matrix B(bold face) (bar) (step S7) and ends the processing. The system precoding matrix B (bold face)(bar) is a matrix in which precoding matrixes for each of the terminals 2 are arranged in a column direction. When the processing is not ended for all the terminals 2 (No at step S6), the precoder unit 12 changes the desired terminal and returns to step S1.

First, the precoder unit 12 multiplies transmission signals output from the primary modulating units 11-1 to 11-$m$ with a power distribution matrix P(bold face)(bar) generated on the basis of power distribution notified from the ordering unit 13, multiplies a multiplication result with the system precoding matrix B(bold face)(bar) calculated by the processing explained above, and outputs a multiplication result to the transmission-waveform shaping units 14-1 to 14-T. That the precoder unit 12 multiplies signals transmitted from the transmission antennas with a power distribution matrix corresponding to a result of the power distribution and the system precoding matrix B(bold face)(bar), which is a precoding matrix for carrying out the precoding. As it is seen from Expressions (1), (2), and (3), the power distribution matrix is a matrix having, as a diagonal element, a square root of electric power P(bold face)$_i$ distributed to the terminal 2-$i$. The transmission-waveform shaping units 14-1 to 14-T perform the processing explained above and transmit the signals after the processing from the antennas 15-1 to 15-T.

For example, m=4. That is, when four terminals 2 are present, it is assumed that the precoder unit 12 selects, as IUI terminals of the desired terminal, the terminal 2 having the next index of the desired terminal and the terminal 2 having the next index of the terminal 2. That is, concerning beam formation to the terminal 2-1, interference to the terminal 2-2 and the terminal 2-3 is allowed, concerning beam formation to the terminal 2-2, interference to the terminal 2-3 and the terminal 2-4 is allowed, concerning beam formation to the terminal 2-3, interference to the terminal 2-4 and the terminal 2-1 is allowed, and, concerning beam formation to the terminal 2-4, interference to the terminal 2-1 and the terminal 2-2 is allowed. In this case, an effective system transmission line matrix to which the system precoding matrix B(bold face)(bar) in this embodiment is applied can be represented by the following Expression (8).

[Math. 8]

$$\overline{H}_e = \begin{bmatrix} H_1B_1 & O & H_1B_3 & H_1B_4 \\ H_2B_1 & H_2B_2 & O & H_2B_4 \\ H_3B_1 & H_3B_2 & H_3B_3 & O \\ O & H_4B_2 & H_4B_3 & H_4B_4 \end{bmatrix} \quad (8)$$

Figure 7:
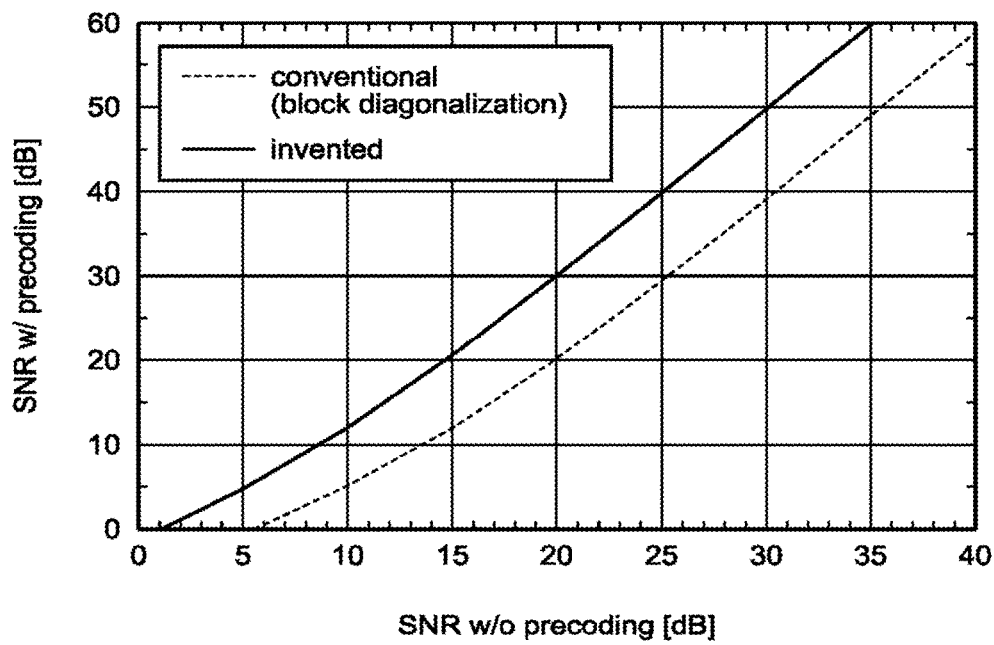
FIG. 7 is a diagram showing an average SNR during precoding application with respect to an average SNR during precoding non-application in the case of the number of base station transmission antennas T=16, the number of terminals m=8, and the number of terminal reception branches $N_w$=2.

Concerning an average received signal power-to-noise power ratio (Signal-to-Noise power Ratio: SNR) in the desired terminal, an improvement effect by the precoding is quantitatively indicated from a simulation result. FIG. 7 shows an average SNR during precoding application with respect to an average SNR during precoding non-application in the case of the number of base station transmission antennas T=16, the number of terminals m=8, and the number of terminal reception branches $N_w$=2. Therefore, a system transmission line matrix is a matrix of 16×16. Elements in the system transmission line matrix are independent and similar complex Gaussian random numbers. The number of times of random number trials is set to 10000 times. A broken line in the figure indicates a characteristic (conventional) at the time when the precoding by the conventional BD method is applied. A solid line indicates a characteristic (invented) at the time when the precoding in this embodiment is applied. It is seen from FIG. 7 that the precoding in the embodiment of the present invention can improve an average SNR more than the conventional BD method. For example, when compared in a case in which an SNR during precoding non-application is 20 decibels, the average SNR can be improved by 10 decibels with respect to the conventional BD method by applying the precoding in the embodiment of the present invention. This is because a diversity effect is obtained by forming a beam directed to the desired terminal as explained above.

Processing by the ordering unit 13 is explained. To enable the precoder unit 12 to easily select the IUI terminal, arrangement order of the terminals 2 is important. The ordering unit 13 determines the arrangement order of the terminal 2. The ordering unit 13 determines power distribution to the terminals 2.

Figure 8:
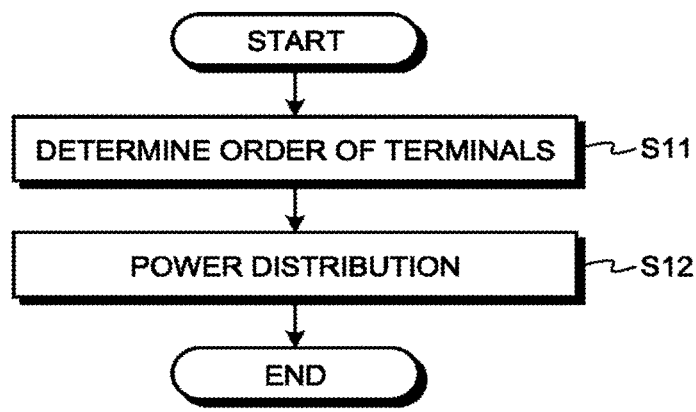
FIG. 8 is a diagram representing a flowchart showing an example of a processing procedure of an ordering unit in the first embodiment.

FIG. 8 is a flowchart showing an example of a processing procedure of the ordering unit 13 in this embodiment. The ordering unit 13 determines the order of the terminals 2 (step S11). The ordering unit 13 notifies the determined order to the precoder unit 12. Examples of a method of ordering include a method of ordering the terminals 2 in the order of transmission line gains (squares of a Frobenius norm of a transmission line matrix) of the terminals 2, a method of ordering the terminals 2 in descending order or ascending order of non-negative eigenvalues or non-negative singular values of transmission line matrixes between the base station 1 and the terminals 2, a method of ordering the terminals 2 such that geographical positions of adjacent terminals, for example, azimuth angles viewed from the base station 1 are close to each other or different from each other, and a method of ordering the terminals 2 such that a correlation between transmission line matrixes of the adjacent terminals, that is, the magnitude of diagonal terms of a cross correlation matrix of a transmission line matrix between the terminals increases or decreases. However, the method of ordering is not limited to these methods.

The order of the ordering by the ordering unit 13 can be order decided such that the terminal 2 in the next order of the desired terminal is the IUI terminal corresponding to the desired terminal. Examples of such ordering include a method of ordering the terminals 2 such that geographical positions of the adjacent terminals are close to each other or distant from each other, that is, ordering the terminals 2 such that the terminals continuous in order are geometrically close to each other or separated from each other and a method of ordering the terminals 2 such that a correlation between transmission line matrixes of the adjacent terminals increases or decreases, that is, ordering the terminals 2 such that a correlation between transmission line matrixes of the terminals 2 continuous in order increases or decreases. When the terminals 2 are ordered such that the azimuth angles viewed from the base station 1 are different from each other, for example, the terminals 2 corresponding to indexes are selected in such a manner as to select any terminal 2 as a first terminal 2, select, as a second terminal 2, a terminal that is in a most distant geographical position from the first terminal 2, and select, as a third terminal 2, the terminal 2 that is in a most distant geographical position from the second terminal 2 and is not ordered.

The ordering unit 13 determines power distribution to the terminals 2 (step S12). The ordering unit 13 notifies a result of the power distribution, that is, electric power distributed to the terminals 2 to the precoder unit 12. The precoder unit 12 calculates a preceding matrix on the basis of a result of the power distribution. For example, the power distribution is carried out according to a water filling principle on the basis of a transmission line gain of the terminals 2. Alternatively, the precoder unit 12 carries out the power distribution to equalize reception quality of all the terminals 2, that is, such that a product of the transmission line gain and the distributed power is an equivalent value among all the terminals 2. However, the power distribution is not limited to the above. Note that the order of step S11 and step S12 can be opposite.

Processing in the decoder unit 23 of the terminal 2 is explained. A transmission line component observed by the terminal 2, which is the receiving apparatus that receives a beam formed by the base station 1 using the system precoding matrix in this embodiment explained above, is considered. As explained above, it is assumed that the number of IUI terminals L is two. It is assumed that, in the terminal 2-$i$, a signal transmitted to a terminal 2-$p$ and a signal transmitted to a terminal 2-$q$ by the base station 1 are observed as interference signals. That is, it is assumed that, in the base station 1, the terminal 2-$i$ is selected as an IUI terminal of the terminal 2-$k$. At this point, a received signal received by the terminal 2-$i$ includes a desired transmission line component $H_i B_i$, an interfered component $H_i B_p$ by the signal transmitted to the terminal 2-$p$, and an interfered component $H_i B_q$ by the signal transmitted to the terminal 2-$q$. Therefore, a received signal $r_i(t)$ received by the terminal 2-$i$ can be represented by the following Expression (9). In the expression, $s_i(t)$ is a transmission signal transmitted from the base station 1 to the terminal 2-$i$ and $s_k(t)$ is a transmission signal transmitted from the base station 1 to the terminal 2-$k$.

[Math. 9]

$$r_i(t)=H_i B_i \sqrt{P_i} s_i(t)+H_i B_p \sqrt{P_p} s_p(t)+H_i B_q \sqrt{P_q} s_q(t)+n_i(t) \qquad (9)$$

The decoder unit 23 of the terminal 2 detects, from the received signal $r_i(t)$, the transmission signal $s_i(t)$ transmitted to the terminal 2-$i$. The detection of the transmission signal $s_i(t)$ from the received signal $r_i(t)$ can be realized by general MIMO decode processing. For example, as described in "T. Ohgane, T. Nishimura, and Y. Ogawa, "Applications of Space Division Multiplexing and Those Performance in a MIMO Channel," IEICE Trans. Commun., vol. E88-B, no. 5, pp. 1843-1851, May 2005.", a linear detection method represented by ZF (Zero-Forcing) and a minimum mean square error (MMSE) standard can be applied. Alternatively, a nonlinear detection method represented by maximum likelihood estimation or an interference canceller (IC) can also be applied. Any MIMO decode processing can be used. Note that the MIMO decode processing performed by the decoder unit 23 can be carried out on $y_i(t)$ before reception weight multiplication instead of being carried out on $r_i(t)$ after the reception weight multiplication. MIMO decode processing in this case is also the same as the general MIMO decode processing.

In the above explanation, the number of antennas T of the base station 1 and the number of reception branches $N_w$ of the terminal 2 satisfy the relation of $T \geq N_{w,\ total} - N_w = (m-L) \times N_w$. However, there is no limitation on the number of antennas included in the terminal 2. The present invention is also applicable when the number of antennas is different for each of the terminals 2 and when the number of reception branches is different for each of the terminals 2. For example, when the number of IUI terminals is set to L=2, the number of antennas $N_{R,\ 1}$ and the number of branches $N_{w,\ 1}$ of a terminal 2-1 satisfy a relation of $N_{R,\ 1} \geq N_{w,\ 1}$, and the IUI terminals for the terminal 2-1, which is the desired terminal, are the terminal 2-$j$ and the terminal 2-$k$, the present invention is applicable if $T \geq (\Sigma_{l=1}^{m}(N_{w,\ 1})) - N_{w,\ j} - N_{w,\ k}$ is satisfied in a relation between the base station 1 and all desired terminals.

Figure 9:
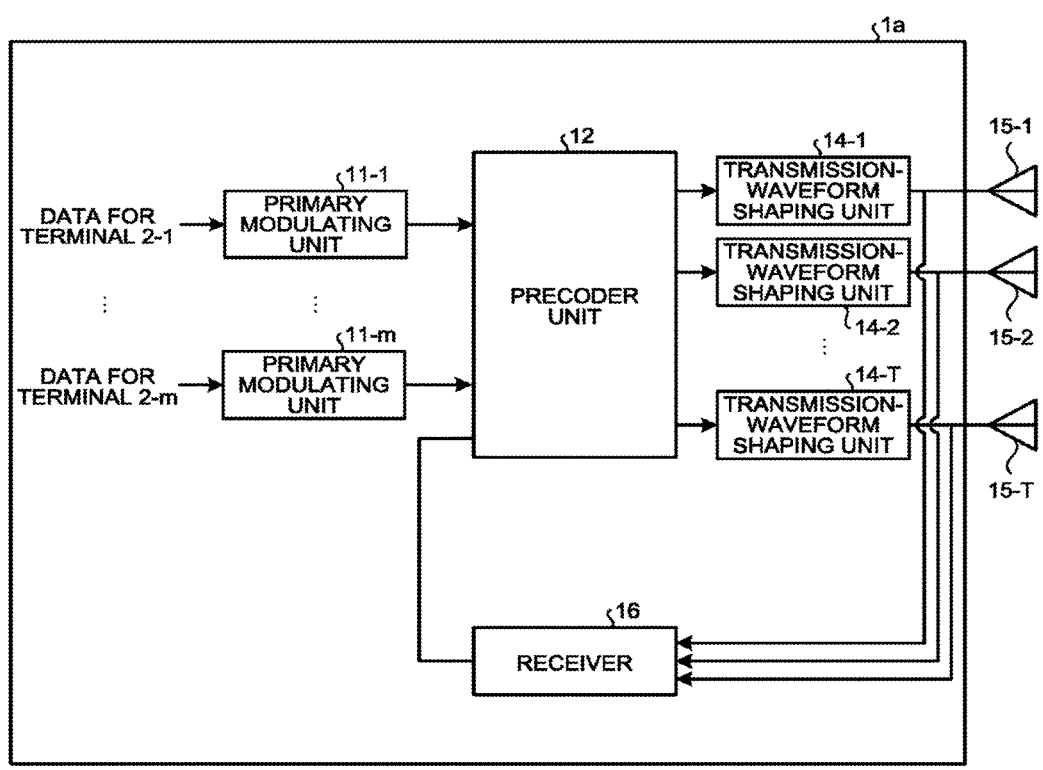
FIG. 9 is a diagram showing a configuration example of a base station not including the ordering unit.

In FIG. 2 referred to above, the example is shown in which the base station 1 includes the ordering unit 13. However, the base station 1 can include a configuration shown in FIG. 9 without including the ordering unit 13. FIG. 9 is a diagram showing a configuration example of a base station 1$a$ not including the ordering unit 13. In FIG. 9, components having the same functions as the functions of the base station 1 shown in FIG. 2 are denoted by the same reference numerals and signs as those in the base station 1 shown in FIG. 2. In the base station 1$a$ shown in FIG. 9, rearrangement by the ordering unit 13 is not performed. However, the precoder unit 12 can select two or more IUI terminals according to the selection method explained above and carry out the operation explained above. Consequently, in the base station 1$a$ shown in FIG. 9, it is possible to form a beam that forms null for the terminals 2 other than the desired terminal and the IUI terminals as in the beam formation by the base station 1 shown in FIG. 2.

As explained above, in this embodiment, the base station 1 decides, for each of the terminals 2, two or more IUI terminals that allow interference and forms a beam that forms null for the terminals 2 other than the desired terminal and the IUI terminals. Therefore, it is possible to improve a diversity gain in the transmission target terminal 2 compared with the BD method while suppressing IUI.

Second Embodiment

Figure 10:
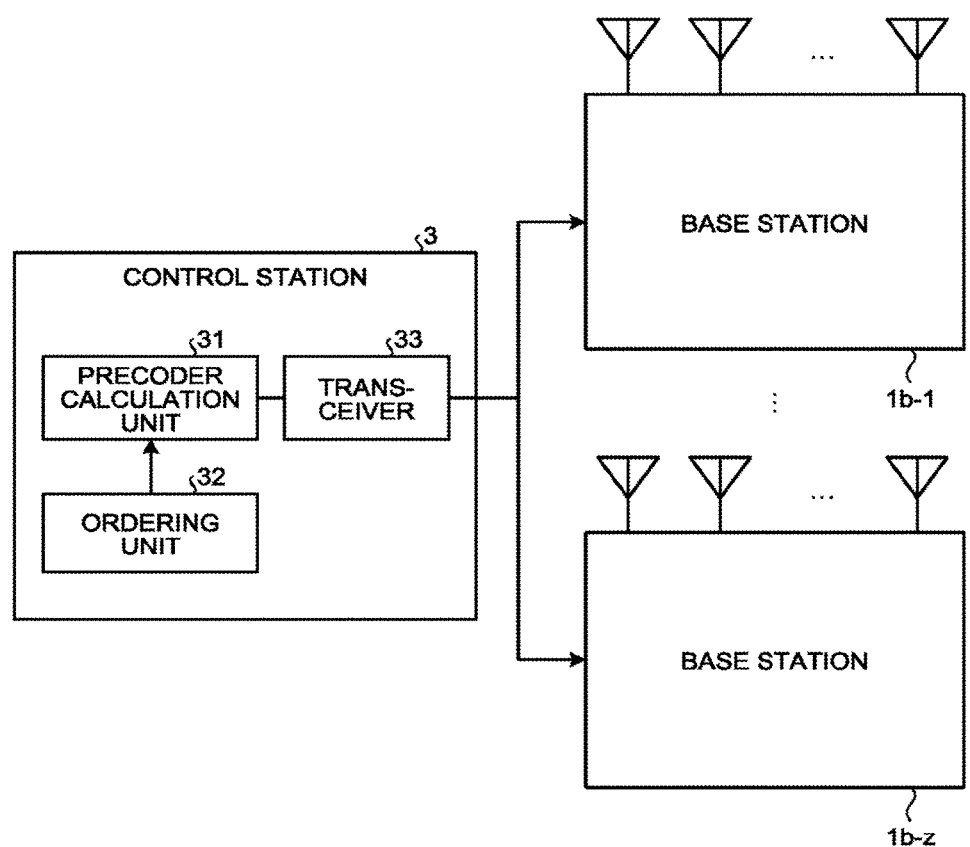
FIG. 10 is a diagram showing the configuration of a control station and a base station controlled by the control station in a second embodiment.

FIG. 10 is a diagram showing the configuration of a control station 3 and base stations 1*b*-1 to 1*b*-*z* controlled by the control station 3 in a second embodiment according to the present invention. In the figure, z is an integer equal to or larger than two. In the first embodiment, the example is explained in which beams are formed by antennas 15-1 to 15-T mounted on the base station 1. However, not only this, but, when T antennas are distributedly mounted on a plurality of base stations, the same system precoding matrix as the system precoding matrix in the first embodiment an be used. When the base stations 1*b*-1 to 1*b*-*z* are explained without being distinguished, the base stations 1*b*-1 to 1*b*-*z* are described as base stations 1*b*. In this embodiment, a total numbers of the numbers of antennas included in the base stations 1*b*-1 to 1*b*-*z* is T.

The control station 3 shown in FIG. 10 includes a precoder calculation unit 31, an ordering unit 32, and a transceiver 33. The precoder calculation unit 31 carries out the same processing as the processing by the precoder unit 12 in the first embodiment. That is, the precoder calculation unit 31 calculates a precoding matrix for performing precoding such that received power in the terminals 2 excluding desired terminals, which are the terminals 2 at transmission destinations of transmission signals transmitted by the base stations 1*b*-1 to 1*b*-*z*, and IUI terminals, which are the terminals 2 other than the desired terminals, is equal to or smaller than a threshold. However, the precoder calculation unit 31 receives transmission line information used for calculation of a system preceding matrix from the base stations 1*b*-1 to 1*b*-*z* through the transceiver 33. A method in which the base stations 1*b*-1 to 1*b*-*z* acquire the transmission line information is the same as the method in the first embodiment. The ordering unit 32 carries out the same processing as the processing by the ordering unit 13 in the first embodiment. The transceiver 33 performs reception processing for signals received from the base stations 1*b*-1 to 1*b*-*z* and transmission processing for signals transmitted to the base stations 1*b*-1 to 1*b*-*z*. The transceiver 33 transmits the system preceding matrix, which is the preceding matrix calculated by the precoder calculation unit 31, and power distribution calculated by the ordering unit 32 respectively to the base stations 1*b*-1 to 1*b*-*z*. Each of the base stations 1*b*-1 to 1*b*-*z* includes one or more transmission antennas.

Figure 11:
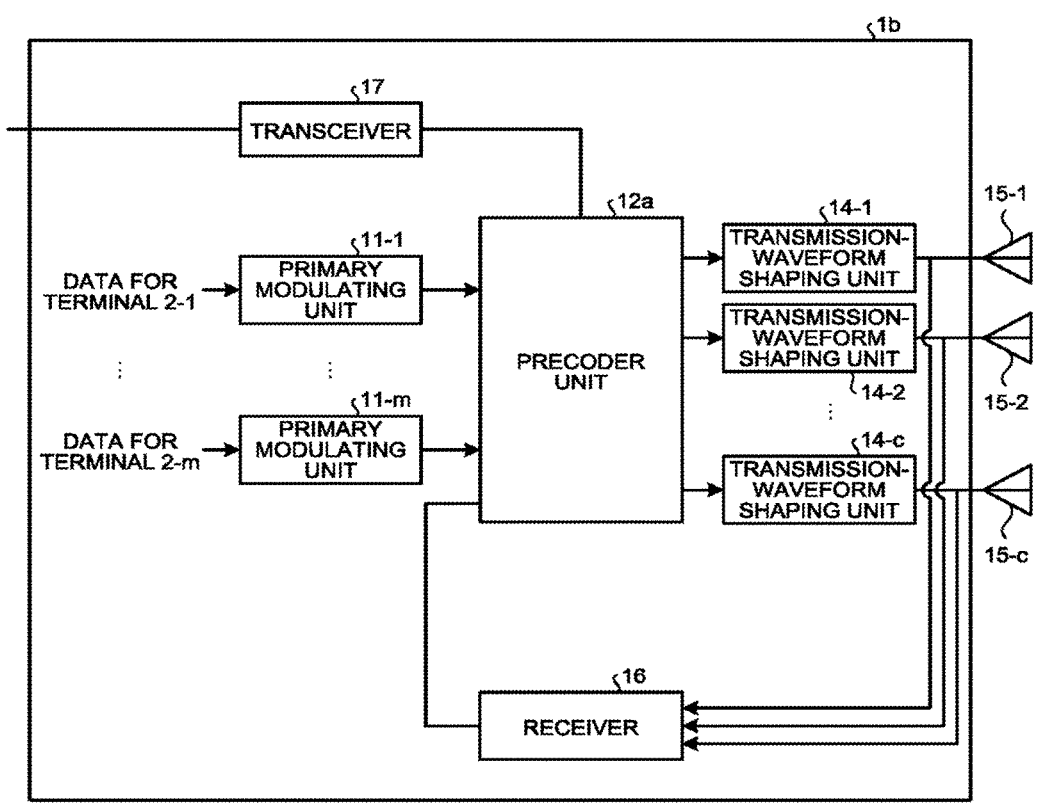
FIG. 11 is a diagram showing a configuration example of the base station in the second embodiment.

FIG. 11 is a diagram showing a configuration example of the base station 1*b* in this embodiment. As shown in FIG. 11, the base station 1*b* is the same as the base station 1 in the first embodiment except that a transceiver 17 is added to the base station 1 in the first embodiment and the base station 1*b* includes a precoder unit 12*a* instead of the precoder unit 12. However, the number of the transmission-waveform shaping units and the number of antennas are respectively c; c is an integer equal to or larger than one. Components having the same functions as the functions in the first embodiment are denoted by the same reference numerals and signs as those in the first embodiment and redundant explanation is omitted.

The transceiver 17 performs reception processing for a signal received from the control station 3 and transmission processing for a signal to be transmitted to the control station 3. The transceiver 17 acquires transmission line information from the receiver 16 and transmits the transmission line information to the control station 3. The transceiver 17 outputs a system precoding matrix and power distribution received from the control station 3 the precoder unit 12*a*. The precoder unit 12*a* multiplies transmission signals output from the primary modulating units 11-1 to 11-*m* with a power distribution matrix P(bold face)$_i$ generated on the basis of the power distribution received from the transceiver 17, further multiplies the transmission signals with the system precoding matrix B(bold face)(bar) received from the transceiver, 17 and outputs a multiplication result to transmission-waveform shaping units 14-1 to 14-*c*.

Hardware configurations of the control station 3 and the base station 1*b* are explained. The same components as the components in the first embodiment among components of the base station 1*b* can be realized by the hardware configuration explained in the first embodiment. The precoder calculation unit 31 and the ordering unit 32 of the control station 3 are processing circuits. Like the processing circuit that realizes the precoder unit 12 and the ordering unit 13 in the first embodiment, the precoder calculation unit 31 and the ordering unit 32 can be dedicated hardware or can be a control circuit including a memory and a CPU that executes a program stored in the memory. The control circuit that realizes the precoder calculation unit 31 and the ordering unit 32 is, for example, the control circuit 400 shown in FIG. 5. The precoder unit 12*a* is also a processing circuit. The processing circuit can be dedicated hardware or can be a control circuit including a memory and a CPU that executes a program stored in the memory. The control circuit that realizes the precoder unit 12*a* is, for example, the control circuit 400 shown in FIG. 5.

The transceiver 33 of the control station 3 is configured by a transmitter and a receiver. The transceiver 17 of the base station 1*b* is also configured by a transmitter and a receiver.

As explained above, in this embodiment, the control station 3 calculates the same system precoding matrix B(bold face)(bar) as the system precoding matrix in the first embodiment and notifies the system precoding matrix B(bold face)(bar) to the base station 1*b*. Therefore, even when the communication system includes a plurality of base stations 1*b*, it is possible to obtain the same effects as the effects in the first embodiment.

Third Embodiment

Figure 12:
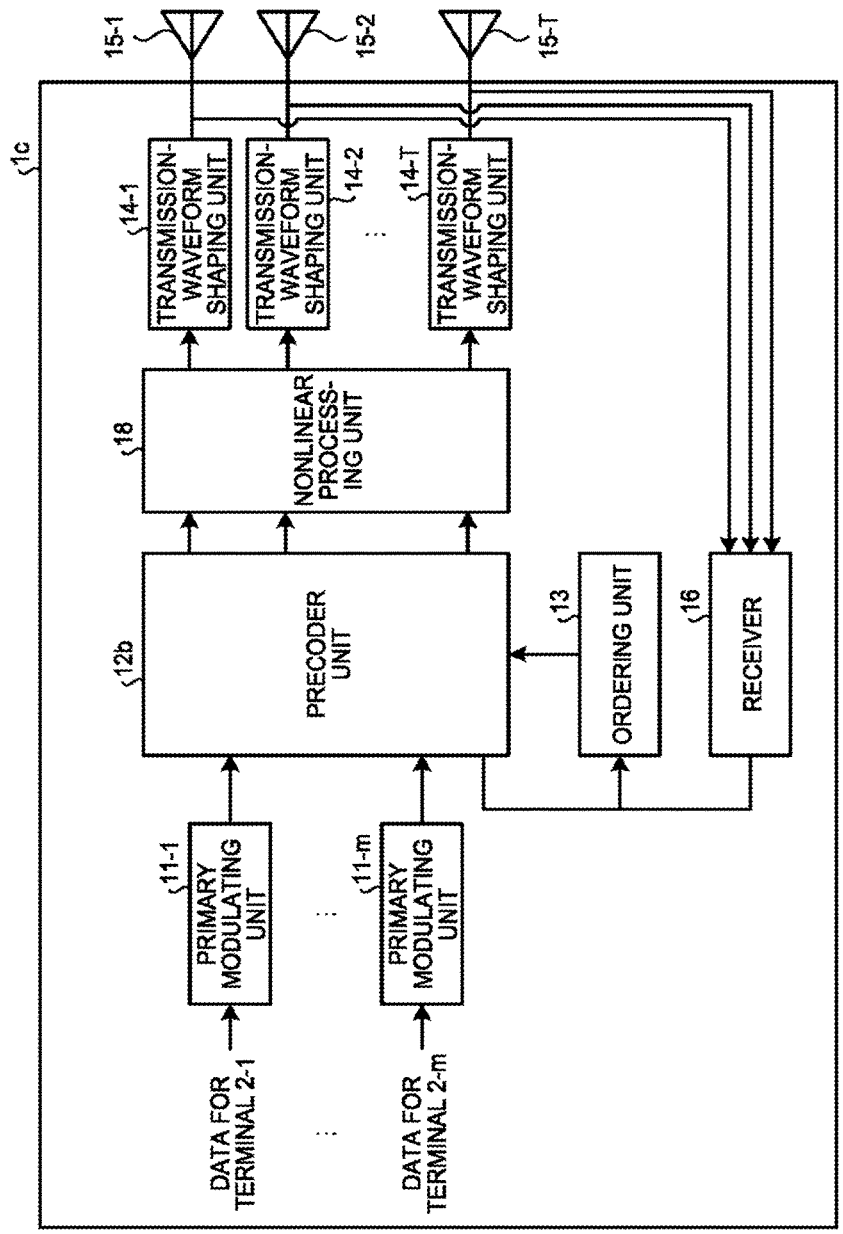
FIG. 12 is a diagram showing a configuration example of a base station in a third embodiment.

FIG. 12 is a diagram showing a configuration example of a base station 1*c* in a third embodiment according to the present invention. The base station 1*c* in this embodiment is the same as the base station 1 in the first embodiment except that the precoder unit 12 of the base station 1 in the first embodiment is replaced with a precoder unit 12*b* and a nonlinear processing unit 18 is added. The terminals 2-1 to 2-*m* in this embodiment are the same as the terminals 2-1 to 2-*m* in the first embodiment. Components having the same functions as the functions in the first embodiment are denoted by the same reference numerals and signs as those in the first embodiment and redundant explanation is omitted.

In this embodiment, in the terminal 2-1 to the terminal 2-($m$–L), as in the first embodiment, one IUI terminal is selected for each of desired terminals and a precoding matrix is calculated. L is the number of IUI terminals explained in the first embodiment. Note that it is assumed that branch numbers of the signs of the terminal 2-1 to the terminal 2-($m$–1) indicate order after ordering by the ordering unit 13 and the ordering unit 13 performs rearrangement such that the terminals 2 can be selected as the IUI terminal in order from the next index of the desired terminal. For example, as explained in the first embodiment, it is assumed that the terminals 2 are ordered such that geographical positions of terminals continuous in order are away or a correlation of transmission line matrixes decreases. In this embodiment, concerning a terminal 2-($m$–L+1) to the terminal 2-$m$, which are L terminals 2 from the last, the number of IUI terminals is set to be smaller than L, that is, the number of IUI terminals is reduced to be smaller than the number of IUI terminals of the terminals from the terminal 2-1 to the terminal 2-($m$–L).

Figure 13:
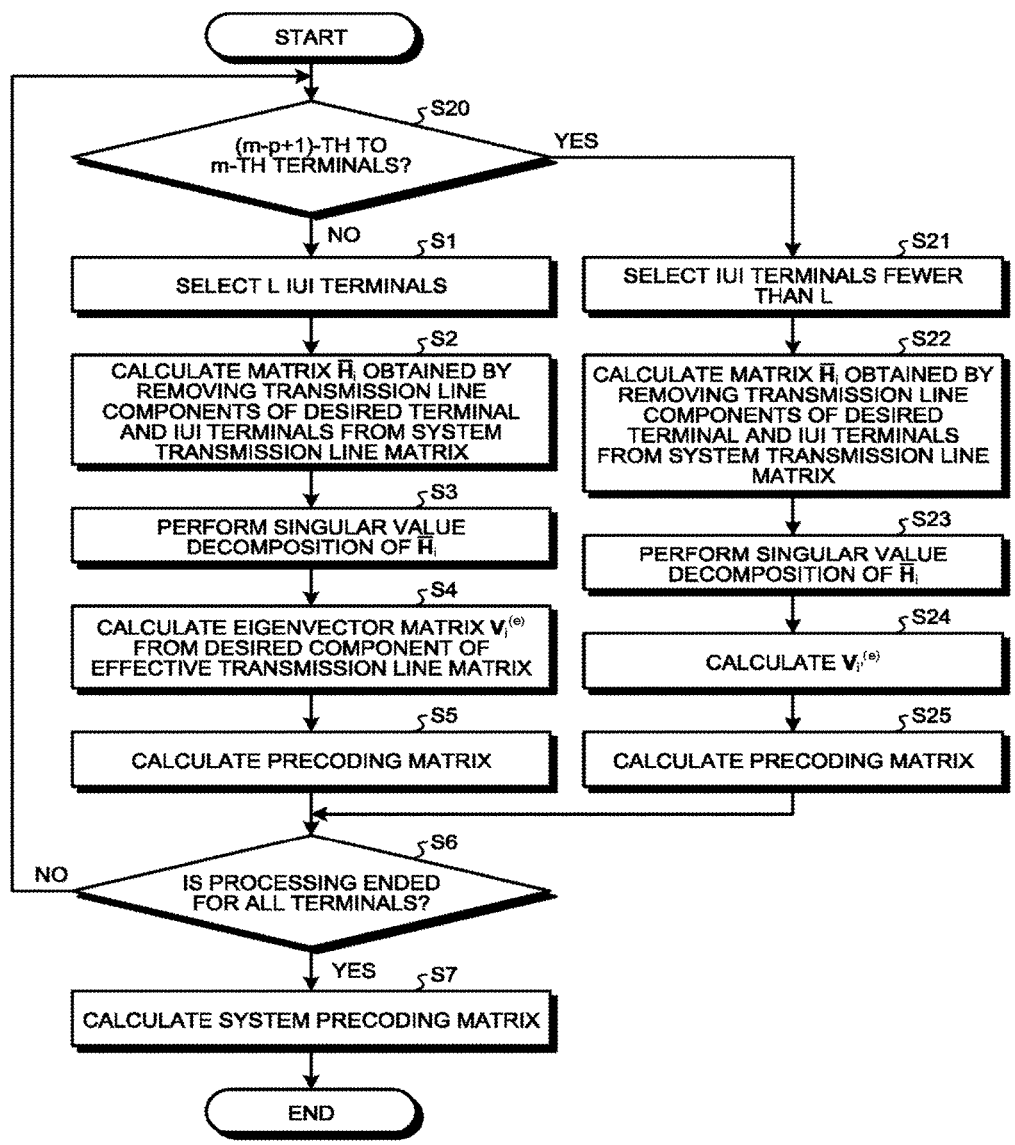
FIG. 13 is a diagram representing a flowchart showing an example of a processing procedure in a precoder unit in the third embodiment.

FIG. 13 is a flowchart showing an example of a processing procedure in the precoder unit 12*b* in this embodiment. The precoder unit 12*b* selects a desired terminal as in the first embodiment and determines whether the desired terminal is the terminals 2-($m$–L+1) to the terminal 2-$m$ (step S20). When the desired terminal is not an m-th terminal 2 (No at step S20), the precoder unit 12*b* proceeds to step S1. Step S1 to step S7 are the same as the steps in the first embodiment.

When the desired terminal is the terminal 2-($m$–L+1) to the terminal 2-$m$ (Yes at step S20), the precoder unit 12*b* selects the IUI terminals fewer than L corresponding to the terminal 2-$i$ ($i$≥$m$–L+1), that is, smaller in number than L terminals (step S21). Concerning the terminal 2-$i$($i$≥$m$–L+1), the precoder unit 12*b* calculates a matrix H(bold face)$_{i'}$(bar) obtained by excluding a desired transmission line component from the system transmission line matrix indicated by Expression (9) (step S22). As indicated by Expression (10), the following singular value decomposition of the matrix H(bold face)$_{i'}$(bar) can be performed. The precoder unit 12*b* performs the singular value decomposition of the matrix H(bold face)$_{i'}$(bar) (step S23).

$$\overline{H}_{i'} = \begin{bmatrix} H_1 \\ H_2 \\ \vdots \\ H_{i-1} \end{bmatrix} = U_{i'} \sum_{i'} V_{i'}^H = U_{i'} \begin{bmatrix} \sum_{i'}^{(s)} & 0 \end{bmatrix} \begin{bmatrix} V_{i'}^{(s)H} \\ V_{i'}^{(n)H} \end{bmatrix} \quad (10)$$

In the expression, U(bold face)$_{i'}$ is a left singular vector matrix of H(bold face)$_{i'}$(bar), V(bold face)$_{i'}$ is a right singular vector matrix, and Σ(bold face)$_{i'}$ is a singular value matrix having singular values in diagonal terms. In Σ(bold face)$_i$, when the singular values of the diagonal terms are in descending order of powers according to magnitudes, as indicated by Expression (10), the singular values can be represented by being divided into a partial diagonal matrix Σ(bold face)$_{i'}^{(s)}$ configured by ($N_{w,\ total}$–$N_w$) non-zero singular values and a zero matrix 0(bold face) corresponding to (T–($N_{w,\ total}$–$N_w$)) zero singular values. Right singular vectors V(bold face)$_{i'}^{(s)}$ and V(bold face)$_{i'}^{(n)}$ respectively corresponding to Σ(bold face)$_m^{(s)}$ and the zero matrix 0(bold face) are present. When V(bold face)$_{i'}^{(n)}$ is a precoding matrix of the terminal 2-$i$, an effective transmission line matrix for the terminal 2-$i$ can be represented by the following Expression (11). When the precoding matrix is used, null-steering is performed for the terminals 2 other than the terminal 2-$i$ to the terminal 2-$m$.

[Math. 11]

$$\overline{H}_{e,i'} = HV_{i'}^{(n)} = \begin{bmatrix} H_1 V_{i'}^{(n)} \\ H_2 V_{i'}^{(n)} \\ \vdots \\ H_{i-1} V_{i'}^{(n)} \\ H_i V_{i'}^{(n)} \\ \vdots \\ H_m V_{i'}^{(n)} \end{bmatrix} = \begin{bmatrix} 0 \\ 0 \\ \vdots \\ 0 \\ H_i V_{i'}^{(n)} \\ \vdots \\ H_m V_{i'}^{(n)} \end{bmatrix} \quad (11)$$

The precoder unit 12*b* calculates V(bold face)$_{i'}^{(n)}$ and thereafter forms a beam space suitable for the terminal 2-$i$ from a component corresponding to the terminal 2-$i$ ($i$≥$m$–L+1), which is the desired terminal in Expression (11), that is, the desired component H(bold face)$_i$V(bold face)$_{i'}^{(n)}$. That is, the precoder unit 12*b* applies SVD to H(bold face)$_i$V(bold face)$_{i'}^{(n)}$, applies the singular value decomposition to a non-negative value Hermitean matrix (H(bold face)$_i$V(bold face)$_{i'}^{(n)}$)$^H$(bold face)$_i$V(bold face)$_{i'}^{(n)}$, and calculates an eigenvector matrix V(bold face)$_{i'}^{(e)}$ corresponding to a large eigenvalue (step S24). The large eigenvalue is an eigenvalue equal to or larger than a threshold. It is possible to realize beam formation for multiplying V(bold face)$_{i'}^{(n)}$ representing a full steering with V(bold face)$_{i'}^{(n)}$ to form signal spaces for only the terminal 2-$i$ to the terminal 2-$m$ and then improve a reception gain in the terminal 2-$i$. Consequently, a precoding matrix for the terminal 2-$i$ in this embodiment can be represented by the following Expression (12).

Referring back to FIG. 13, the precoder unit 12*b* calculates, concerning $i$=($m$–L+1) to $m$, a precoding matrix of the terminal 2-$i$ on the basis of Expression (12) (step S25) and proceeds to step S6.

[Math. 12]

$$B_i = V_{i'}^{(n)} V_{i'}^{(e)} \quad (12)$$

As explained above, in the case of $i$≤$m$–L, the terminal 2-($i$+1) to the terminal 2-($i$+L+1) are set as the IUI terminals. In the case of $i$≥$m$–L+1, the preceding matrix for realizing the null steering for the terminals excluding the terminal 2-$i$ to the terminal 2-$m$, that is, the terminal 2-1 to the terminal 2-($i$–1) is calculated and applied to the system transmission line. Then, an effective system transmission line matrix indicated by Expression (13) is observed. Note that, in an illustration of Expression (13), $m$=6, L=2, and $i$=5.

[Math. 13]

$$\overline{H}_e = \begin{bmatrix} H_1 B_1 & 0 & 0 & 0 & 0 & 0 \\ H_2 B_1 & H_2 B_2 & 0 & 0 & 0 & 0 \\ H_3 B_1 & H_3 B_2 & H_3 B_3 & 0 & 0 & 0 \\ 0 & H_4 B_2 & H_4 B_3 & H_4 B_4 & 0 & 0 \\ 0 & 0 & H_5 B_3 & H_5 B_4 & H_5 B_5 & 0 \\ 0 & 0 & 0 & H_6 B_4 & H_6 B_5 & H_6 B_6 \end{bmatrix} \quad (13)$$

In this embodiment, at step S7, the precoder unit 12*b* generates a system preceding matrix using the precoding matrix calculated at step S5 as the preceding matrix of the terminals 2-1 to 2-($m$–L) and using the precoding matrix calculated at step S25 as the precoding matrix of the terminal 2-($m$–L+1) to the terminal 2-$m$. That is, when K is an integer equal to or larger than two (K=m–L) and L is an integer equal to or larger than two, a precoding matrix for setting first to K-th terminals 2 as desired terminals among terminals ordered by the ordering unit 13 is a matrix for performing the preceding such that received power for fourth receiving apparatuses, which are the terminals 2 excluding the desired terminals and the L IUI terminals, is equal to or smaller than a threshold. On the other hand, a precoding matrix for setting K+1-th and subsequent terminals 2 as desired terminals is a matrix for performing the precoding such that received power in third receiving apparatuses, which are the terminals 2 excluding the desired terminals and the IUI terminals fewer than L, is equal to or smaller than the threshold. Note that the number smaller than L includes zero as well.

As it is seen from Expression (13), unlike Expression (8) in the first embodiment, the effective system transmission line matrix in this embodiment is subjected to tridiagonalizaton under blocks. That is, layering is realized in which a component corresponding to a desired terminal is present in diagonal components and components of IUI terminals are present under the diagonal components, that is, in second and third layers. Consequently, it is possible to apply non-linear MU-MIMO processing for performing sequential interference removal on a transmission side as explained below.

The precoder unit 12$b$ outputs the system precoding matrix B(bold face)(bar) calculated by the processing explained above, transmission signals output from the primary modulating units 11-1 to 11-$m$, and power distribution to the nonlinear processing unit 18. The nonlinear processing unit 18 carries out processing for removing, on a transmission side, in advance, components to be an interference signal on a reception side as explained below using the tridiagonalizaton under blocks.

The nonlinear processing unit 18 carries out the nonlinear MU-MIMO processing on a signal output from the precoder unit 12$b$. According to Expression (13), when the signal output from the precoder unit 12$b$ is received by the terminal 2-$i$, the received signal can be represented by the following Expression (14).

[Math. 14]

$$r_i(t) = H_i B_i \sqrt{P_i} \, s_i(t) + H_i \left( \sum_{j=\max(i-N_i,1)}^{i-1} B_j \sqrt{P_j} \, s_j(t) \right) + n_i(t) \quad (14)$$

Note that a second term on the right side of Expression (14) is an interference term. In the case of the terminal 2-1, the term is not generated. Therefore, a transmission signal s(bold face)$_1$(t) is known. Making use of this, transmission signals are sequentially calculated to calculate, for example, s(bold face)$_2$(t). If transmission signals s(bold face)$_{i-L}$(t), and s(bold face)$_{i-1}$(t) for a terminal 2-($i$–L) to a terminal 2-($i$–1) are known, it is possible to remove interference on the reception side by correcting s(bold face)$_i$(t) to a signal given by Expression (15).

[Math. 15]

$$\tilde{s}_i(t) = s_i(t) - \left( \sum_{j=\max(i-N_i,1)}^{i-1} \frac{H_i B_j \sqrt{P_j}}{H_i B_i \sqrt{P_i}} \tilde{s}_j(t) \right) \quad (15)$$

Therefore, the nonlinear processing unit 18 corrects s(bold face)$_i$(t) according to the above Expression (15). The terminal 2-1 is not set as an IUI terminal. That is, IUI does not occur in a received signal of the terminal 2-1. Therefore, it is unnecessary to apply the correction to the transmission signal s(bold)$_1$(t) to the terminal 2-1. Therefore, by sequentially determining transmission signals to set s(bold)$_1$(t) as known, correct s(bold)$_2$(t), and correct s(bold)$_3$(t) using s(bold)$_2$(t) after the correction, it is possible to remove, on the transmission side, that is, in the base station 1$c$, in advance, IUI that occurs on the reception side. That is, the nonlinear processing unit 18 is an interference removing unit that performs sequential interference removal for sequentially determining transmission signals from a transmission signal of the terminal 2 not set as an IUI terminal and removing interference. In this embodiment, the processing for sequentially determining transmission signals from a transmission signal of the terminal 2 not set as an IUI terminal and removing interference as explained above is referred to as sequential interference removal. By applying the system precoding matrix in this embodiment, unlike the general nonlinear MU-MIMO processing in which the number of transmission interference cancellations increases in proportion to the number of terminals, it is possible to limit the number of interference cancellations to only the number of interference cancellations for the L terminals. Therefore, compared with the general non-linear MU-MIMO processing, it is possible to suppress deterioration due to a computation amount reduction and a signal subtraction.

The non-linear processing unit 18 applies the sequential interference removal to transmission signals, thereafter multiplies the transmission signals with a power distribution matrix P(bold face)$_i$ generated on the basis of power distribution, further multiplies the transmission signals with the system precoding matrix B(bold face)(bar) calculated by the processing explained above, and transmits the transmission signals to the transmission-waveform shaping units 14-1 to 14-T.

However, an actually transmitted signal is expanded or reduced to be unstable because of transmission processing given by Expression (15). Therefore, the nonlinear processing unit 18 can apply processing for stabilizing a transmission signal waveform according to a modulo operation disclosed in "H. Harashima and H. Miyakawa, 'Matched-Transmission Technique for Channels With Intersymbol Interference,' IEEE Trans. Commun., vol. 20, August 1972." or perturbation processing disclosed in "B. M. Hochwald, C. B. Peel, and A. L. Swindlehurst, 'A Vector-Perturbation Technique for Near-Capacity Multiantenna Multiuser Communication-Part II: Perturbation,' IEEE Trans. Commun., vol. 53, no. 3, pp. 537-544, March 2005."

A hardware configuration of the base station 1$c$ is explained. The same components as the components in the first embodiment among components of the base station 1$c$ can be realized by the hardware configuration explained in the first embodiment. The precoder unit 12$b$ and the nonlinear processing unit 18 in this embodiment are processing circuits. The precoder unit 12$b$ and the nonlinear processing unit 18 can be dedicated hardware or can be a control circuit including a memory and a CPU that executes a program stored in the memory. The control circuit that realizes the precoder unit 12$b$ and the nonlinear processing unit 18 is, for example, the control circuit 400 shown in FIG. 5.

As explained above, in this embodiment, in the terminals 2-1 to 2-($m$–L), the L IUI terminals are set as in the first embodiment. In the terminals 2-($m$–L+1) to 2-$m$, IUI terminals are set to less than L terminals and the system precoding matrix is generated. Transmission signals are corrected to remove, on the transmission side, in advance, interference that occurs on the reception side by the nonlinear processing unit 18. Therefore, the same effects as the effects in the first embodiment are obtained. It is possible to layer a multiuser space and it is possible to realize a nonlinear MU-MIMO scheme in which deterioration due to a computation amount reduction and a signal subtraction is suppressed.

The configurations explained in the embodiments above indicate examples of the contents of the present invention. The configurations can be combined with other publicly-known technologies. A part of the configurations can be omitted or changed in a range not departing from the spirit of the present invention.

REFERENCE SIGNS LIST 1, 1a, 1b-1 to 1b-z, 1c base station
2-1 to 2-m terminal
3 control station
11-1 to 11-m primary modulating unit
12, 12a, 12b precoder unit
13, 32 ordering unit
14-1 to 14-T, 14-c transmission-waveform shaping unit
15-1 to 15-T, 15-c, 21-1 to 21-R antenna
16 receiver
17, 33 transceiver
18 nonlinear processing unit
22-1 to 22-R reception-waveform shaping unit
23 decoder unit
24 demodulating unit
25 transmitter
31 precoder calculation unit.

The invention claimed is:

1. A transmitting apparatus comprising:
a plurality of transmission antennas configured to form a plurality of beams respectively directed to a plurality of receiving apparatuses; and
a precoder configured to perform precoding on signals transmitted from the transmission antennas such that received power in third receiving apparatuses, which are the receiving apparatuses excluding a first receiving apparatus serving as a transmission destination of a transmission signal among the receiving apparatuses and two or more second receiving apparatuses among the receiving apparatuses, is equal to or smaller than a threshold, the precoding being performed by excluding transmission line components of the first receiving apparatus and the two or more second receiving apparatuses.

2. The transmitting apparatus according to claim 1, wherein received power in the second receiving apparatuses is larger than the threshold.

3. The transmitting apparatus according to claim 1, wherein signals transmitted from the transmission antennas are multiplied with a first matrix, which is a precoding matrix for reducing the received power in the third receiving apparatuses to the threshold or less, and a multiplication result is multiplied with a second matrix, which is a precoding matrix for forming a beam directed to the first receiving apparatus.

4. The transmitting apparatus according to claim 1, wherein the second receiving apparatuses corresponding to the first receiving apparatus are selected on the basis of a correlation between a transmission line matrix between the first receiving apparatus and the transmitting apparatus and transmission line matrixes between the receiving apparatuses other than the first receiving apparatus and the transmitting apparatus.

5. The transmitting apparatus according to claim 1, wherein the second receiving apparatuses corresponding to the first receiving apparatus are selected on the basis of geographical separation degrees between the first receiving apparatus and the receiving apparatuses other than the first receiving apparatus.

6. The transmitting apparatus according to claim 1, further comprising an ordering processor to determine order of the receiving apparatuses in the precoding.

7. The transmitting apparatus according to claim 6, wherein
the ordering processor carries out power distribution to the receiving apparatuses, and
the precoder multiplies signals transmitted from the transmission antennas with a power distribution matrix corresponding to a result of the power distribution and a precoding matrix for carrying out the precoding.

8. The transmitting apparatus according to claim 6, wherein the order is order decided such that the receiving apparatus next to the first receiving apparatus in order are the second receiving apparatuses corresponding to the first receiving apparatus.

9. The transmitting apparatus according to claim 8, wherein the ordering processor performs the ordering such that the receiving apparatuses continuous in order are geographically close to or separated from each other.

10. The transmitting apparatus according to claim 8, further comprising an interference remover to perform sequential interference removal, wherein
when K is an integer equal to or larger than two and L is an integer equal to or larger than two, a precoding matrix for setting first to K-th receiving apparatuses among the receiving apparatuses ordered by the ordering unit as the first receiving apparatus is a matrix for performing the precoding such that the received power in the third receiving apparatus is equal to or smaller than the threshold and a precoding matrix for setting K+1-th and subsequent receiving apparatuses among the receiving apparatuses as the first receiving apparatus is a matrix for performing the precoding such that received power in fourth receiving apparatuses, which are the receiving apparatuses excluding the first receiving apparatus and the second receiving apparatuses fewer than L, and
the interference remover sequentially carries out, as the sequential interference removal, processing for removing interference that occurs in the receiving apparatuses next in order.

11. The transmitting apparatus according to claim 6, wherein the ordering processor sets the order to descending order of non-negative eigenvalues or non-negative singular values of transmission line matrixes between the transmitting apparatus and the receiving apparatuses.

12. The transmitting apparatus according to claim 6, wherein the ordering processor sets the order to ascending order of non-negative eigenvalues or non-negative singular values of transmission line matrixes between the transmitting apparatus and the receiving apparatuses.

13. A receiving apparatus that receives signals transmitted from the transmitting apparatus according to claim 1, the receiving apparatus comprising a decoder to extract a desired signal from the signals received from the transmitting apparatus.

14. A control station in a communication system configured to form a plurality of beams respectively directed to a plurality of receiving apparatuses by a plurality of transmission antennas mounted on a plurality of transmitting apparatuses, the control station comprising:
- a precoder calculator configured to calculate a precoding matrix for performing precoding such that received power in third receiving apparatuses, which are the receiving apparatuses excluding a first receiving apparatus serving as a transmission destination of a transmission signal among the receiving apparatuses and two or more second receiving apparatuses among the receiving apparatuses, is equal to or smaller than a threshold, the precoding matrix being calculated based on excluding transmission line components of the first receiving apparatus and the two or more second receiving apparatuses, and
- a transceiver configured to transmit the precoding matrix to the transmitting apparatuses.

15. A transmission precoding method in a transmitting apparatus including a plurality of transmission antennas configured to form a plurality of beams respectively directed to a plurality of receiving apparatuses, the transmission precoding method comprising:
- determining a first receiving apparatus, which is the receiving apparatus serving as a transmission destination of a transmission signal, and two or more second receiving apparatuses, which are the receiving apparatuses other than the first receiving apparatus, the precoding matrix being calculated based on excluding transmission line components of the first receiving apparatus and the two or more second receiving apparatuses; and
- performing precoding on signals transmitted from the transmission antennas such that received power in the receiving apparatuses excluding the first receiving apparatus and excluding the second receiving apparatuses is equal to or smaller than a threshold.

* * * * *